United States Patent
Katsuno

(10) Patent No.: US 10,266,029 B2
(45) Date of Patent: Apr. 23, 2019

(54) STRUCTURE OF SEMI-FINISHED PRODUCT FOR MOVEMENT RESTRICTION MEMBER, APPARATUS FOR ATTACHING SEMI-FINISHED PRODUCT TO BAR MEMBER, STRUCTURE FOR ATTACHMENT OF SEMI-FINISHED PRODUCT AND BAR MEMBER, AND METHOD OF ATTACHING SEMI-FINISHED PRODUCT

(71) Applicants: NHK SPRING CO, LTD., Yokohama (JP); NHK SPRING PRODUCTION COMPANY, Isehara, Kanagawa (JP)

(72) Inventor: Kenji Katsuno, Kanagawa (JP)

(73) Assignees: NHK SPRING CO., LTD., Yokohama, Kanagawa (JP); NHK SPRING PRODUCTION COMPANY, Isehara, Kanagawa (JP)

( * ) Notice: Subject to any disclaimer, the term of this patent is extended or adjusted under 35 U.S.C. 154(b) by 0 days.

(21) Appl. No.: 15/119,593

(22) PCT Filed: Dec. 8, 2014

(86) PCT No.: PCT/JP2014/082453
§ 371 (c)(1),
(2) Date: Aug. 17, 2016

(87) PCT Pub. No.: WO2015/125381
PCT Pub. Date: Aug. 27, 2015

(65) Prior Publication Data
US 2017/0050488 A1 Feb. 23, 2017

(30) Foreign Application Priority Data
Feb. 18, 2014 (JP) .................................. 2014-028712

(51) Int. Cl.
*B60G 21/055* (2006.01)
*B21D 53/88* (2006.01)
(Continued)

(52) U.S. Cl.
CPC ......... *B60G 21/0551* (2013.01); *B21D 39/02* (2013.01); *B21D 53/88* (2013.01);
(Continued)

(58) Field of Classification Search
CPC ............ B60G 21/0551; B60G 2204/41; B60G 2204/1222; B60G 2202/135;
(Continued)

(56) References Cited

U.S. PATENT DOCUMENTS 2,283,918 A 5/1942 Dekome
5,013,166 A 5/1991 Domer
(Continued)

FOREIGN PATENT DOCUMENTS

CN 201736763 U 2/2011
CN 202782566 U 3/2013
(Continued)

OTHER PUBLICATIONS

Yoshizawa et al., Limiting ring blank material and stable rod with limiting ring, Mar. 13, 2013, China Patent Office, CN 202782566 U, Machine Translation of Description (Year: 2013).*
(Continued)

*Primary Examiner* — James A English
(74) *Attorney, Agent, or Firm* — Merchant & Gould P.C.

(57) ABSTRACT

A semi-finished product (31) includes a first curved portion on one end of a plate-shaped bridge portion (33), and a second curved portion (37) on the other end of the bridge portion (33). The second curved portion (37) includes at the end a second lock portion (51) to lock with a first lock portion (41). The bridge portion (33) and the inner circum-
(Continued)

ferential surfaces of the first and second curved portions (35, 37) are pressure-contacted and caulked on the outer circumferential surface of the stabilizer bar (11) by first and second dies (61, 62). At least one of the inner circumferential surfaces (31*c*) of the first and second curved portions (35, 37) and the outer circumferential surface of the stabilizer bar opposed to the inner surfaces (31*c*) is formed with an anti-slippage portion (38). The inner circumferential surfaces (31*c*) of the first and second curved portions (35, 37) and the outer circumferential surface of the stabilizer bar (11) have an anti-slippage material (Co) therebetween.

6 Claims, 16 Drawing Sheets

(51) Int. Cl.
| | | |
|---|---|---|
| *F16B 7/14* | (2006.01) | |
| *B21D 39/02* | (2006.01) | |
| *B60G 21/04* | (2006.01) | |
| *F16B 17/00* | (2006.01) | |

(52) U.S. Cl.
CPC ................ *B60G 21/04* (2013.01); *F16B 7/14* (2013.01); *B60G 2204/1222* (2013.01); *B60G 2204/44* (2013.01); *B60G 2204/45* (2013.01); *B60G 2206/427* (2013.01); *B60G 2206/82012* (2013.01); *B60G 2206/8403* (2013.01); *F16B 17/004* (2013.01)

(58) Field of Classification Search
CPC .......... B60G 2206/82; B60G 2206/821; B29C 65/02; B29C 65/48; F16F 15/08
See application file for complete search history.

(56) References Cited

U.S. PATENT DOCUMENTS

| | | | |
|---|---|---|---|
| 2003/0111817 A1 | 6/2003 | Fader et al. | |
| 2004/0070161 A1* | 4/2004 | Fader | B60G 21/0551 |
| | | | 280/124.166 |
| 2012/0024463 A1* | 2/2012 | Grundmeier | B60G 21/0551 |
| | | | 156/91 |
| 2013/0270787 A1* | 10/2013 | Suwa | B60G 21/0551 |
| | | | 280/124.107 |
| 2014/0131970 A1* | 5/2014 | Kuroda | F16C 11/0657 |
| | | | 280/124.107 |
| 2015/0343876 A1* | 12/2015 | Yoshizawa | B60G 21/055 |
| | | | 280/124.107 |

FOREIGN PATENT DOCUMENTS

| | | | | |
|---|---|---|---|---|
| EP | 1071571 A1 | 1/2001 | | |
| EP | 1502780 A1 | 2/2005 | | |
| EP | 1741579 A1 | 10/2007 | | |
| EP | 2896521 A1 | 7/2015 | | |
| GB | 2263250 A | 7/1993 | | |
| JP | H05-023763 A | 2/1993 | | |
| JP | H05-65434 U | 8/1993 | | |
| JP | 11-129121 A | 5/1999 | | |
| JP | 11-210713 A | 8/1999 | | |
| JP | 2000-334538 A | 5/2000 | | |
| JP | 2000-334538 A | 12/2000 | | |
| JP | 2001-163026 A | 6/2001 | | |
| JP | 2001-165127 A | 6/2001 | | |
| JP | 2004-174595 A | 6/2004 | | |
| JP | 2008-265355 A | 11/2008 | | |
| JP | 2010-30421 A | 2/2010 | | |
| JP | 2013002597 A | * | 1/2013 | .......... F16C 11/0657 |
| WO | 99/54157 A1 | 10/1999 | | |
| WO | 2014/042038 A1 | 3/2014 | | |

OTHER PUBLICATIONS

Honda et al., Production of large diameter braille rivet and die used Therefor, Dec. 5, 2000, Japan Patent Office, JP 2000-334538 A, Machine Translation of Description (Year: 2000).*
First Office Action for Chinese Patent Application No. 201480075904.9, dated Jul. 4, 2017.
International Search Report for International Application No. PCT/JP2014/082453 dated Mar. 3, 2015 (4 pages).
International Written Opinion for International Application No. PCT/JP2014/082453 dated Mar. 3, 2015 (6 pages).
Search Report for European Patent Application No. 14883261.1, dated Jul. 27, 2017.
Office Action for Japanese Patent Application No. 2014-028712, dated Aug. 29, 2017.

* cited by examiner

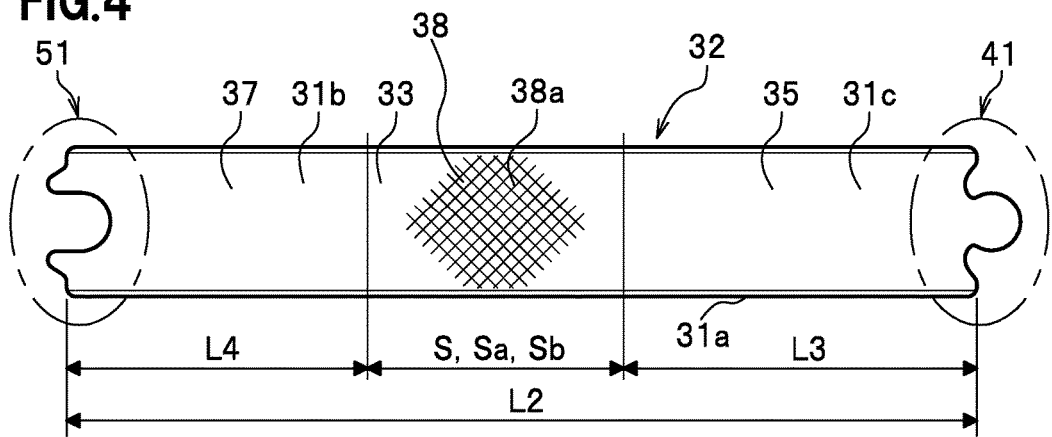
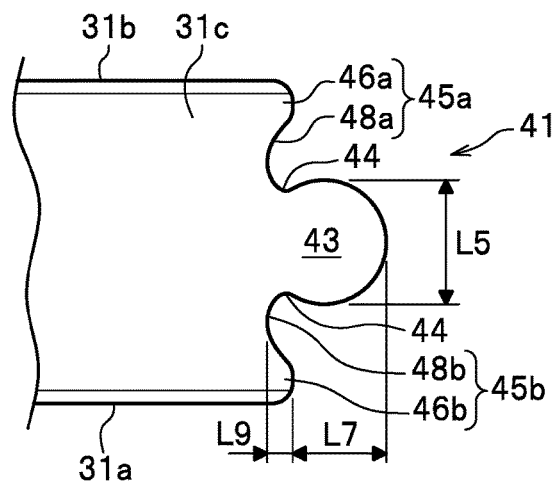
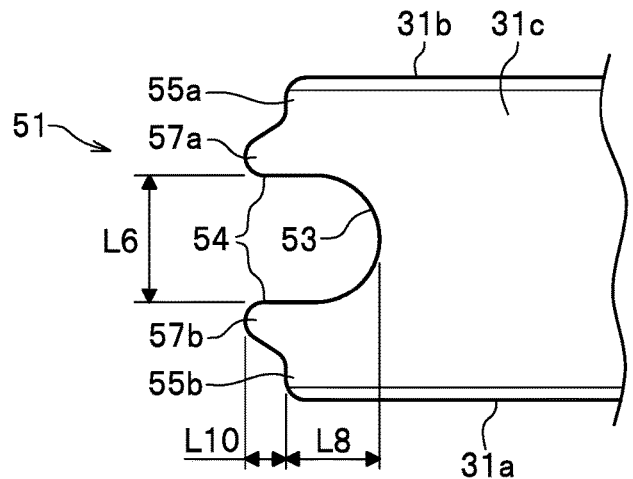

STRUCTURE OF SEMI-FINISHED PRODUCT FOR MOVEMENT RESTRICTION MEMBER, APPARATUS FOR ATTACHING SEMI-FINISHED PRODUCT TO BAR MEMBER, STRUCTURE FOR ATTACHMENT OF SEMI-FINISHED PRODUCT AND BAR MEMBER, AND METHOD OF ATTACHING SEMI-FINISHED PRODUCT

This application is a National Stage Application of PCT/JP2014/082453, filed 8 Dec. 2014, which claims benefit of Serial No. 2014-028712, filed 18 Feb. 2014 in Japan and which applications are incorporated herein by reference. To the extent appropriate, a claim of priority is made to each of the above disclosed applications.

TECHNICAL FIELD

The present invention relates to the structure of a semi-finished product for a movement restriction member to be attached to a bar member such as a stabilizer bar that reduces or prevents the body roll of a vehicle to improve driving stability of the vehicle. The present invention also relates to an apparatus for attaching the semi-finished product to the bar member, the structure for attachment of the bar member and the semi-finished product, and a method of attaching the semi-finished product.

BACKGROUND ART

Typically, an automobile is provided with a stabilizer bar, formed of a solid cylindrical member, to reduce or prevent the body roll of the vehicle and thereby improve driving stability of the vehicle (see, for example, Patent Literature 1). The stabilizer bar is, for example, formed in a letter U shape as a whole, with a torsion bar portion extending straight in a vehicle width direction and paired arm portions extending from respective end portions of the torsion bar portion. The stabilizer bar is attached to the vehicle body, at portions of the torsion bar portion on both sides near the respective arm portions, with rubber cushioning members and letter-U shaped brackets. End portions of the respective arm portions on both sides are supported by suspension arms.

When the vehicle turns, the torsion bar portion of the stabilizer bar configured as such is twisted. A reaction force is generated by the twist and acts as a force reducing or preventing the body roll of the vehicle. Paired flanged anti-displacement members (hereinafter referred to as "movement restriction members") are provided on the torsion bar portion of the stabilizer bar, at positions adjacent to the respective cushioning members. When the vehicle turns, a large force in the vehicle-width direction is inputted to the torsion bar portion to try to move the torsion bar portion axially. If no countermeasure is taken against such axial movement, the torsion bar portion may interfere with accessories in the vehicle body to cause troubles such as generating noise.

To avoid such troubles, the invention described in Patent Literature 1 is configured such that, when the torsion bar portion receives a large force in the vehicle-width direction during a turn of the vehicle, the paired annular movement restriction members provided on the torsion bar portion abut, at their flange portions, against the corresponding cushioning members. The movement restriction members described in Patent Literature 1 restrict axial movement of the torsion bar portion to allow for prevention of troubles caused by the torsion bar portion interfering with the accessories in the vehicle body.

CITATION LIST

Patent Literature

Patent Literature 1: Japanese Patent Application Publication No. 2001-163026

SUMMARY OF INVENTION

Technical Problem

What is required of such movement restriction members attached to the torsion bar portion of the stabilizer bar is not to be displaced in an axial direction of the stabilizer bar even when a large force is axially inputted to the torsion bar portion.

Moreover, it is desired that when a semi-finished product for the movement restriction member, which is the movement restriction member yet to be attached, is attached to the stabilizer bar, the semi-finished product be easily attached, be easily machined, and not produce a defective product.

In view of these points, the anti-displacement technique for stabilizer bars described in Patent Literature 1 still has room for improvement to meet the above-described requirements at a high level.

The present invention has been made in consideration of the above circumstances, and has an objective to provide the structure of a semi-finished product for a movement restriction member, an apparatus for attaching the semi-finished product to a bar member, the structure for attachment of the bar member and the semi-finished product, and a method of attaching the semi-finished product, in which the semi-finished product can be securely fixed to the stabilizer bar without displacement in an axial direction of the stabilizer bar and attached to the stabilizer bar with improved workability.

Solution to Problem

To achieve the above objective, a structure of a semi-finished product for a movement restriction member and a structure for attachment of a bar member and the semi-finished product according to the present invention are, for example, a structure for attachment of a semi-finished product for a movement restriction member and a stabilizer bar (bar member) for a vehicle. The semi-finished product includes a plate-shaped bridge portion, a first curved portion integrally extending from one end portion of the bridge portion, and a second curved portion integrally extending from another end portion of the bridge portion. The semi-finished product is formed in a letter C shape as a whole. The first curved portion includes a first lock portion at an end portion thereof, and the second curved portion includes a second lock portion at an end portion thereof. The second lock portion is configured to engage with the first lock portion. The semi-finished product is caulked such that inner circumferential surfaces of the bridge portion, the first curved portion and the second curved portion are pressure-contacted on an outer circumferential surface of the stabilizer bar using a first die and a second die with the stabilizer bar being placed on the inner circumferential surface of the first curved portion. The semi-finished product includes an inner circumferential surface formed with an anti-slippage portion. The anti-slippage portion is pressed and attached on an anti-slippage material provided on the outer circumferential surface of the stabilizer bar when the semi-finished product is attached to the stabilizer bar.

According to this configuration, the anti-slippage material provided on the outer circumferential surface of the stabilizer bar (bar member) is pressed and attached on the anti-slippage portion formed on the inner circumferential surface of the semi-finished product when the semi-finished product is caulked and attached on the outer circumferential surface of the stabilizer bar with the outer circumferential surface of the stabilizer bar being placed on the inner circumferential surface of the first curved portion of the semi-finished product. Thereby, the anti-slippage portion on the inner circumferential surface of the semi-finished product and the anti-slippage material on the outer circumferential surface of the stabilizer bar bite into and fit with each other to prevent slippage, allowing the semi-finished product to be securely fixed by caulking, without displacement in the axial direction of the stabilizer bar.

Thus, the structure for attachment of the bar member and the semi-finished product for the movement restriction member achieves improved workability, machinability, and favorable displacement preventability in attachment of the semi-finished product to the stabilizer bar by caulking using the first and second dies, and also prevents production of defective products.

Preferably, the anti-slippage portion includes a knurled pattern (knurling) formed with a recess depressed by 30 μm to 700 μm or a projection protruding by 30 μm to 700 μm, and the anti-slippage material includes a coating.

According to this configuration in which the anti-slippage portion of the semi-finished product includes the knurled pattern formed with a recess or a projection of 30 μm to 700 μm, the recess or projection is pressed and attached on the anti-slippage material, which is a coating, interposed between the inner circumferential surface of the semi-finished product and the outer circumferential surface of the stabilizer bar, to form a fine fitting structure. This fine fitting structure causes the semi-finished product and the stabilizer bar to be fixed on each other, enabling their firm attachment.

To be more specific, when the recess or projection of the knurled pattern is each 30 μm to 700 μm in size, the recess or projection is crushed into an appropriate size by the pressure applied upon caulking, thereby increasing frictional resistance at a portion in tight contact with the outer circumferential surface of the stabilizer bar. This improves a braking effect against slippage of the semi-finished product for the movement restriction member, allowing the semi-finished product to be fixed to the stabilizer bar securely.

If the recess or projection of the knurled pattern is each less than 30 μm in size, a fine fitting structure formed is too shallow to produce sufficient displacement prevention effect. If the recess or projection of the knurled pattern is each more than 700 μm in size, the total area of portions fitting with the anti-slippage material on the outer circumferential surface of the stabilizer bar is small. Such an anti-slippage portion cannot provide a desired frictional resistance and therefore cannot provide a good grip, hindering secure fixation of the semi-finished product to the stabilizer bar.

Preferably, the anti-slippage portion is a recess depressed by 30 μm to 700 μm or a projection protruding by 30 μm to 700 μm formed by shot peening.

According to this configuration in which the anti-slippage portion of the semi-finished product is a recess or a projection of 30 μm to 700 μm formed by shot peening, the recess or projection produces an anchor effect which improves the biting effect between the inner circumferential surface of the semi-finished product and the outer circumferential surface of the stabilizer bar. This anchor effect causes the semi-finished product and the stabilizer bar to be fixed to each other, enabling their firm attachment.

Preferably, the anti-slippage portion is made of alumina powder.

According to this configuration in which the anti-slippage portion is made of alumina powder, when the first and second curved portions of the semi-finished product are caulked and fixed on the outer circumferential surface of the stabilizer bar, the alumina powder of the anti-slippage portion on the inner circumferential surface of the semi-finished product bites into the outer circumferential surface of the stabilizer bar. Such pressure attachment of the alumina powder allows the semi-finished product to be fixed to the stabilizer bar securely.

Preferably, with L2 [mm] denoting a length dimension of a work in process before being formed into the letter C shape and S [mm] denoting a dimension of a straight part on an inner surface side of the bridge portion, the S in the semi-finished product of the letter C shape before being attached to the stabilizer bar is expressed by $$L2 \times 0.18 - 2 \leq S \leq L2 \times 0.18 + 2$$

when a plate thickness T of a raw material of the movement restriction member is 5 mm to less than 10 mm, and $$L2 \times 0.18 - 1 \leq S \leq L2 \times 0.18 + 3$$

when the plate thickness T is 3 mm to less than 5 mm.

According to this configuration, when the first curved portion is set on the first die (lower die), the stabilizer bar (bar member) is set on the first curved portion, and the second die (upper die) is lowered toward the second curved portion, the second lock portion is fitted into the first lock portion automatically without any special guide such as a jig.

If the dimension S of the straight part on the inner surface side of the bridge portion is longer than the above range, there is a higher possibility of buckling occurring in the second curved portion or the bridge portion when the second die is lowered. This may hinder the automatic fitting of the second lock portion into the first lock portion. Even if the second lock portion is fitted into the first lock portion, pressure is not applied evenly over the entire circumference during the caulking, increasing the possibility of decreasing the displacement prevention effect.

If the dimension S of the straight part on the inner surface side of the bridge portion is shorter than the above range, the length dimension L2 of the work in process becomes shorter than the diameter of the stabilizer bar, which makes it impossible to set the stabilizer bar on the first curved portion.

The semi-finished product according to the present invention is formed such that the straight part on the inner surface side of the bridge portion has the dimension S of the above range, and therefore avoids such troubles.

An apparatus for attaching a semi-finished product to a bar member according to the present invention is an apparatus for attaching a semi-finished product to a bar member, in which the semi-finished product for a movement restriction member to be attached to the bar member is caulked using a first die and a second die and thereby attached to the bar member. The apparatus includes a displacement preventer configured to prevent the semi-finished product for the movement restriction member set on a cavity of the first die from slipping out of place relative to the first die when the semi-finished product is set on the first die located on a lower side and caulked on the bar member.

According to this configuration of the apparatus for attaching a semi-finished product to a bar member of the present invention, the semi-finished product for the movement restriction member set on the lower first die is prevented by the displacement preventer from slipping out of place relative to the first die when caulked on the bar member. The semi-finished product is held immovably by being pressed to a predetermined set position on the first die.

Thus, with the displacement preventer, the apparatus for attaching a semi-finished product prevents the semi-finished product from being caulked out of place on the bar member when attaching the semi-finished product to the bar member by caulking, to prevent production of a defective product. In addition, the apparatus allows the semi-finished product to be fixed to the bar member in a predetermined wrapping manner (by clinching).

Preferably, the displacement preventer includes a gas spring configured to press the bar member extending from the semi-finished product set on the first die, against the first curved portion of the first die with the semi-finished product interposed between the bar member and the first die.

According to this configuration of the apparatus for attaching a semi-finished product to a bar member, when the semi-finished product is to be attached to the bar member by caulking, the gas spring presses the bar member against the first die with the semi-finished product interposed therebetween to thereby allow the bar member to be held in place. Moreover, being formed by the gas spring, the displacement preventer has no special driving means and is therefore a hard-to-break, energy-saving device.

Preferably, the displacement preventer includes a suction device including a sucker configured to suck either the bar member extending from the semi-finished product set on the first die or the semi-finished product set on the first die and press the semi-finished product against the first curved portion of the first die.

According to this configuration of the apparatus for attaching a semi-finished product to a bar member, when the semi-finished product is to be attached to the bar member by caulking, the sucker of the suction device holds the semi-finished product in place on the first die. Moreover, being formed by the sucker, the displacement preventer has no special driving means and is therefore a hard-to-break, energy-saving device.

Preferably, the displacement preventer includes an unevenness portion formed on an outer circumferential surface of the first curved portion of the semi-finished product to prevent slippage from the first die; and an unevenness of the first die corresponding to the unevenness portion.

According to this configuration of the apparatus for attaching a semi-finished product to a bar member, when the semi-finished product is attached to the bar member by caulking, the unevenness portion formed on the outer circumferential surface of the first curved portion of the semi-finished product engages with the unevenness formed on the first die. Thus, the apparatus prevents the semi-finished product from slipping from the first die and being displaced.

Preferably, the apparatus for attaching a semi-finished product to a bar member includes a first die holder configured to hold the first die; and a jig configured to hold rotatably the first die holder, wherein the jig makes the first die holder turn to an inside-dimension determination position for holding the first die and fixes the first die holder at the inside-dimension determination position when the semi-finished product, which is one of paired left and right semi-finished products to be attached to the bar member, is to be pressed and caulked using the first die and the second die with reference to an inner surface of the semi-finished product facing another one of the paired semi-finished products, and the jig makes the first die holder turn to an outside-dimension determination position for holding the first die and fixes the first die holder at the outside-dimension determination position when the semi-finished product is to be pressed and caulked with reference to an outer surface of the left or right semi-finished product.

Herein, the "inside-dimension determination position" refers to a position to place the inner surface of the semi-finished product when the semi-finished product, which is one of the left and right semi-finished products, is attached to the bar member with reference to its inner surface facing the other one of the left and right semi-finished products. The "outside-dimension determination position" is a position to place the inner surface of the semi-finished product when the left or right semi-finished product is attached to the bar member with reference to its outer surface.

According to this configuration of the apparatus for attaching a semi-finished product, when the semi-finished product is to be attached to the bar member by caulking with reference to the inner surface of the semi-finished product, the first die holder for holding the first die is turned to, and fixed by the jig at, the inside-dimension determination position at which the inner surface of the semi-finished product is used as reference. When the semi-finished product is to be attached to the bar member by caulking with reference to the outer surface of the semi-finished product, the first die holder for holding the first die is turned to, and fixed by the jig at, the outside-dimension determination position at which the outer surface of the semi-finished product is used as reference.

Depending on a predetermined reference surface used in fixing the semi-finished product to the bar member by caulking, the apparatus can easily change the arrangement of the first die holder to support either the inside-dimension positioning using the inner surface as reference or the outside-dimension positioning using the outer surface as reference, by turning the first die holder to the inside-dimension determination position or to the outside-dimension determination position and fixing the first die holder at that position with the jig. As a result, all it takes to attach the semi-finished product to the bar member in a predetermined state is to turn the first die holder to a predetermined position corresponding to that state and fix the first die holder there with the jig. The apparatus can easily turn into an inside-dimension positioning state or an outside-dimension positioning state, and therefore drastically improve production efficiency.

Preferably, in the structure for attachment of a bar member and a semi-finished product for a movement restriction member according to the present invention, the anti-slippage portion is formed with a recess depressed by 30 μm to 700 μm or a projection protruding by 30 μm to 700 μm, and the anti-slippage material includes a coating which is 30 μm to 40 μm thick.

This configuration of the anti-slippage portion of the semi-finished product formed with the recess or projection of 30 μm to 700 μm in size produces an anchor effect when the recess or projection engages with the relatively soft coating. This anchor effect enhances the biting effect between the inner circumferential surface of the semi-finished product and the outer circumferential surface of the bar member. The anchor effect makes the semi-finished product and the bar member fixed to each other, and to be firmly attached because the anti-slippage material, which is a coating, interposed between the semi-finished product and the bar material is pressed and attached to the semi-finished product and the bar member.

Advantageous Effects of Invention

The present invention provides the structure of a semi-finished product for a movement restriction member, an apparatus for attaching the semi-finished product to a bar member, the structure for attachment of the bar member and the semi-finished product, and a method of attaching the semi-finished product, in which the semi-finished product is securely fixed to the stabilizer bar without displacement in an axial direction of the stabilizer bar and attached to the stabilizer bar with high workability.

BRIEF DESCRIPTION OF DRAWINGS

FIG. 4 is a plan view showing a work in process which is the semi-finished product for the movement restriction member before being bent in the manufacture of the semi-finished product for the movement restriction member (an expanded view of the semi-finished product).

FIG. 5 is an enlarged plan view of a main portion including a first lock portion shown in FIG. 4.

FIG. 6 is an enlarged plan view of a main portion including a second lock portion shown in FIG. 4.

DESCRIPTION OF EMBODIMENTS

Figure 1:
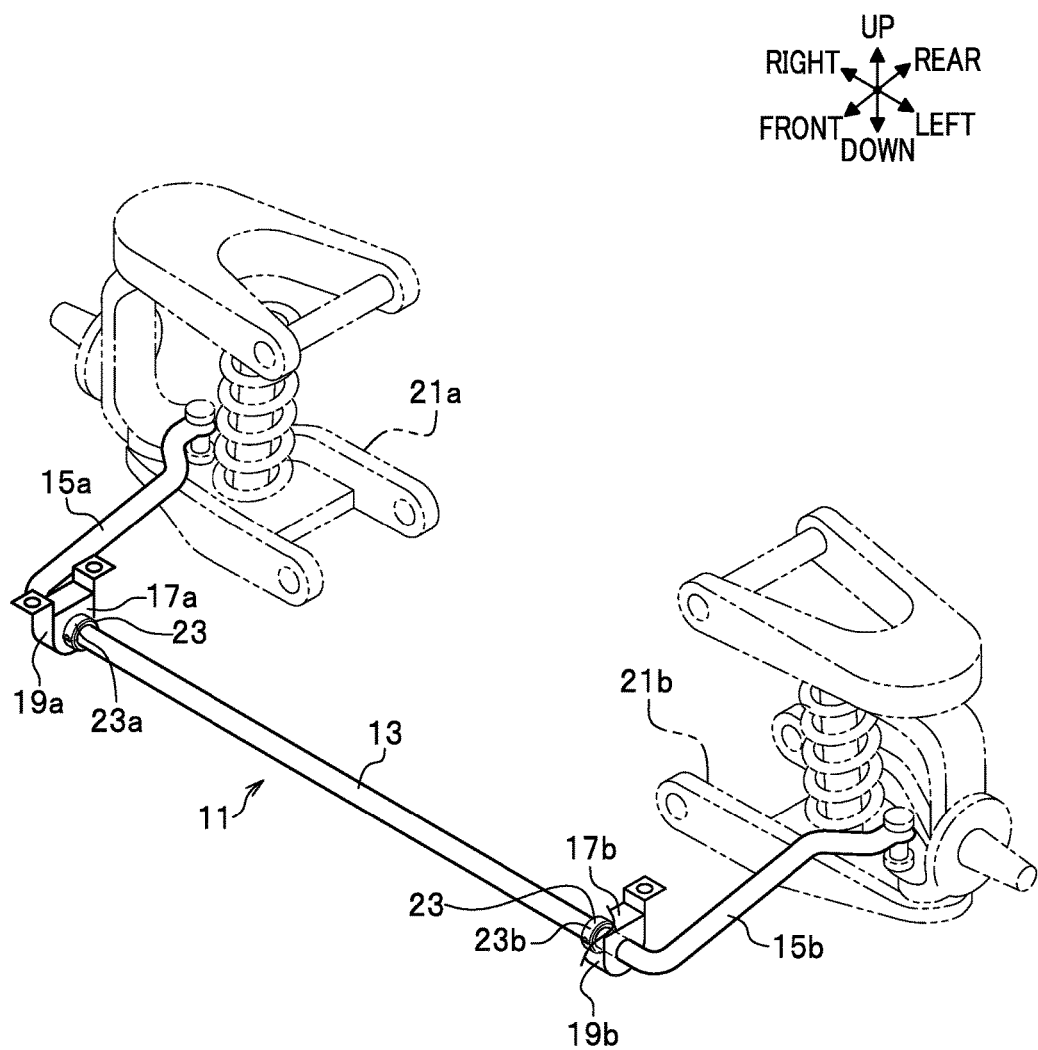
FIG. 1 is a perspective view schematically showing a stabilizer bar having movement restriction members attached to a vehicle.

With reference to the drawings, descriptions are given below of the structure of a semi-finished product for a movement restriction member according to an embodiment of the present invention, an apparatus for attaching the semi-finished product to a bar member, the structure for attachment of the bar member and the semi-finished product, and a method of attaching the semi-finished product.

First, denotation rules for reference numerals used for the convenience of illustration of the embodiment of the present invention are explained. Some of the articles (such as the semi-finished product for the movement restriction member) which are referred to in the description of the embodiment of the present invention are symmetric with respect to a predetermined center line for their structural reasons. In such a line-symmetric article, members having the same function are denoted by the same numerical sign, where necessary. In a line-symmetric article shown in a perspective view, members on the observers' left have their numerical signs followed by the letter "a", and members on the observers' right have their numerical signs followed by the letter "b", where necessary. When called collectively, members having the same function are referred to by their numerical sign only, i.e., without their ordinal number, such as "first" or "second", or the following letters (i.e., the letter a or b is omitted from the reference numeral shown in the drawings, where necessary).

For illustrative convenience, based on a stabilizer bar 11 (bar member) shown in FIG. 1 disposed longitudinally, the longitudinal direction of the stabilizer bar 11 is referred to as a left-right direction, and the direction in which first and second arm portions 15a, 15b extend is referred to as a front-rear direction.

<<Structure for Attachment of the Stabilizer Bar to the Vehicle>>

Before a semi-finished product 31 (see FIG. 2) of a movement restriction member 23 according to the embodiment of the present invention is described, the structure for attachment of the stabilizer bar 11 to a vehicle is described, the stabilizer bar 11 having the movement restriction member 23 as shown in FIG. 1.

The stabilizer bar 11 is a member for reducing the body roll of a vehicle to improve the driving stability of the vehicle, and is formed of a metallic hollow cylindrical member. For example, the stabilizer bar 11 is substantially shaped as the letter U as a whole, including a torsion bar portion 13 extending straight in a vehicle-width direction and the first and second arm portions 15a, 15b extending from respective end portions of the torsion bar portion 13.

The stabilizer bar 11 is attached to a vehicle body via, for example, first and second cushioning members 17a, 17b made of rubber and first and second brackets 19a, 19b shaped as the letter U. The first and second cushioning members 17a, 17b and the first and second brackets 19a, 19b are located on the torsion bar portion 13 at positions near the first and second arm portions 15a, 15b, respectively. End portions of the first and second arm portions 15a, 15b are supported by first and second suspension arms 21a, 21b, respectively.

When the vehicle turns, the torsion bar portion 13 of the stabilizer bar 11 twists about its axis. The twist of the torsion bar portion 13 generates a reaction force about the axis, which acts as a force reducing the body roll of the vehicle.

First and second flanged movement restriction members 23a, 23b are provided on the torsion bar portion 13 of the stabilizer bar 11 at positions adjacent to the first and second cushioning members 17a, 17b, respectively. When the vehicle turns, a large force in the vehicle-width direction is inputted to the torsion bar portion 13 to try to move the torsion bar portion 13 axially. If no countermeasure is taken against such axial movement, the torsion bar portion 13 may interfere with accessories in the vehicle body to cause troubles such as generating noise.

To avoid such a situation, the first and second movement restriction members 23a, 23b attached to the torsion bar portion 13 are configured to abut, at their flanged portions, against the first and second cushioning members 17a, 17b, respectively, when the torsion bar portion 13 receives a large force in the vehicle-width direction upon a turn of the vehicle. The movement restriction members 23 configured as such can restrict the axial movement of the stabilizer bar 11 and thereby prevent troubles caused by interference of the stabilizer bar 11 with the accessories in the vehicle body.

<<Semi-Finished Product for the Movement Restriction Member>>

Next, the semi-finished product 31 of each movement restriction member 23 according to the embodiment of the present invention is described with reference to FIGS. 2 to 6.

Figure 2:
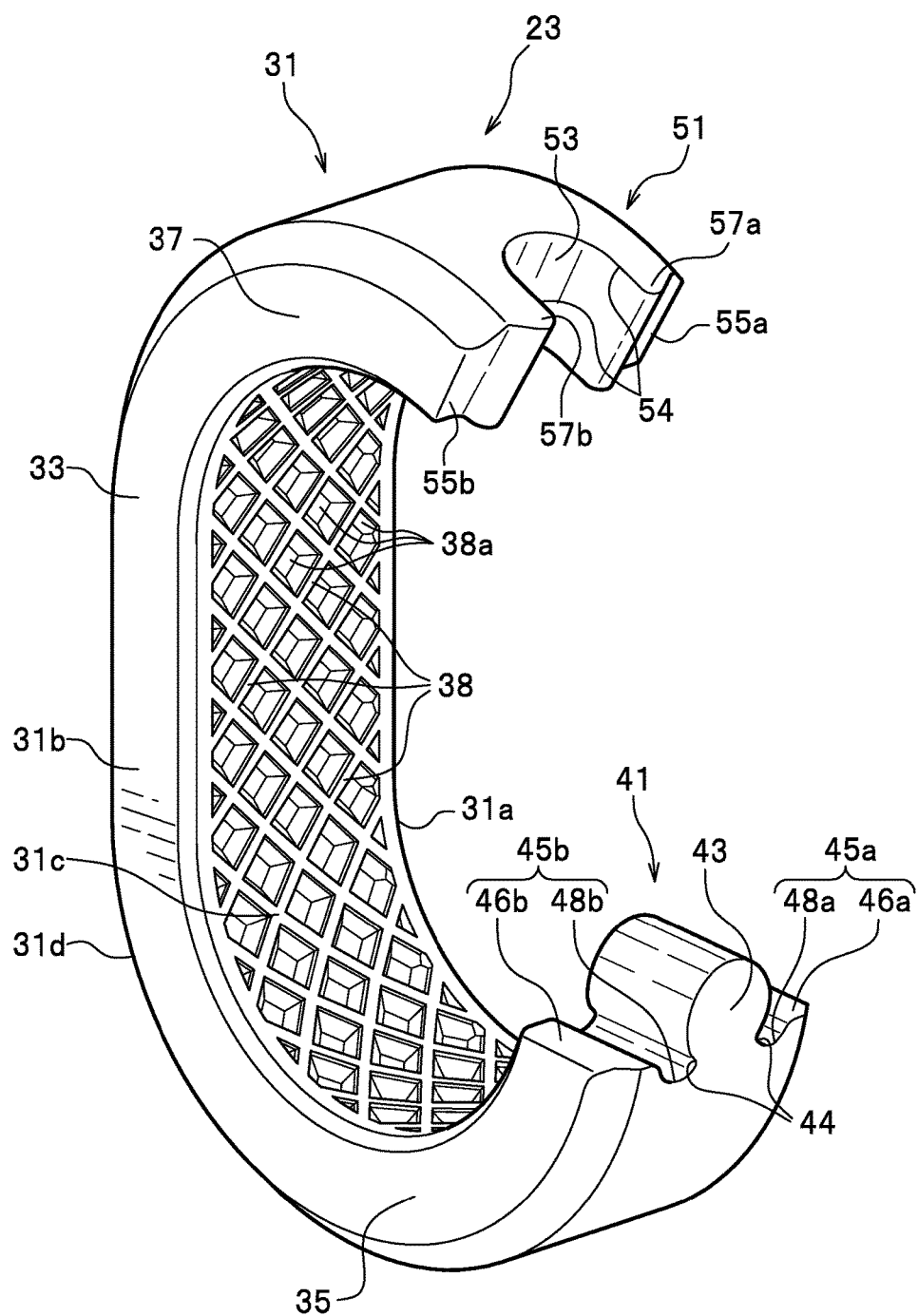
FIG. 2 is an external perspective view showing the structure of a semi-finished product for the movement restriction member according to an embodiment of the present invention.
Figure 3:
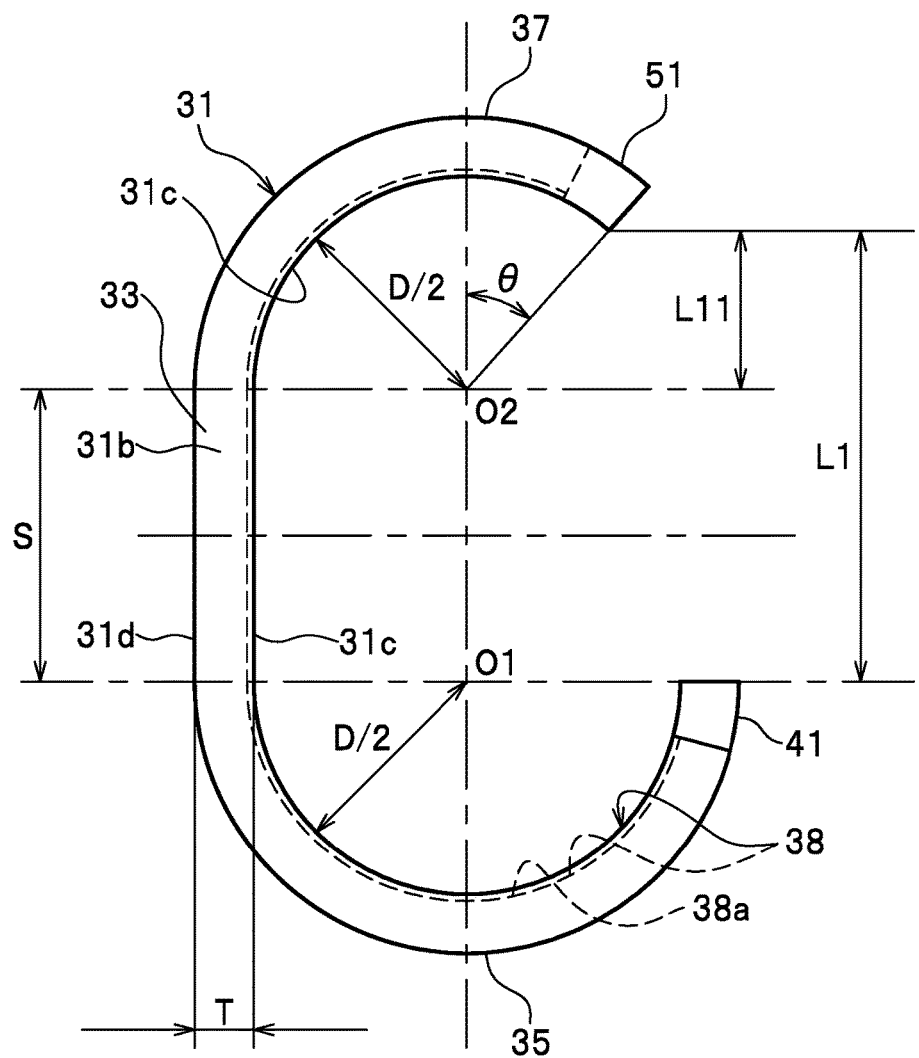
FIG. 3 is a side view showing the structure of the semi-finished product for the movement restriction member.

As shown in FIGS. 2 and 3, the semi-finished product 31 is an unfinished product in the process of being manufactured and processed into the movement restriction member 23 (see FIG. 1) which is to be attached to the stabilizer bar 11 for use in vehicles. The semi-finished product 31 of the movement restriction member 23 includes a plate-shaped bridge portion 33, a first curved portion 35 integrally extending and curving from one end portion of the bridge portion 33, a second curved portion 37 integrally extending and curving from the other end portion of the bridge portion 33, and an anti-slippage portion 38 configured to prevent slippage relative to the stabilizer bar 11.

The semi-finished product 31 is shaped as the letter C as a whole. The semi-finished product 31 is made of, for example, metal such as aluminum or an aluminum alloy.

The semi-finished product 31 of the movement restriction member 23 is manufactured by bending a plate-shaped work in process 32 (see FIGS. 4 to 6) which is an intermediate product in the process of becoming the semi-finished product 31. Specifically, the work in process 32 is bent so that end portions of the bridge portion 33 constituting a center portion of the work in process 32 face each other. The plate-shaped bridge portion 33 has a length dimension S (see FIGS. 3 and 4).

A length dimension L2 of the work in process 32 (see FIG. 4) is set to $$L2=\pi \times (D+T)+\alpha,$$

where D is the diameter of the stabilizer bar 11, T is the plate thickness of the work in process 32, and a is a design tolerance (+3 mm, −0 mm).

Figure 13:
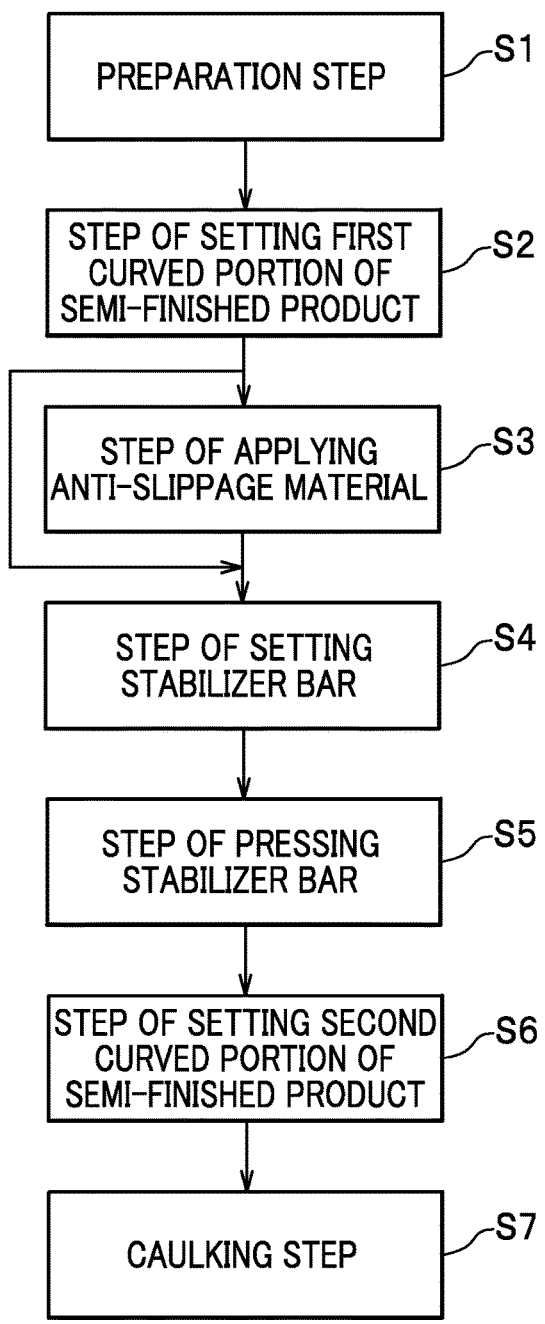
FIG. 13 is a diagram showing steps of attaching the semi-finished product for the movement restriction member to the stabilizer bar.
Figure 14:
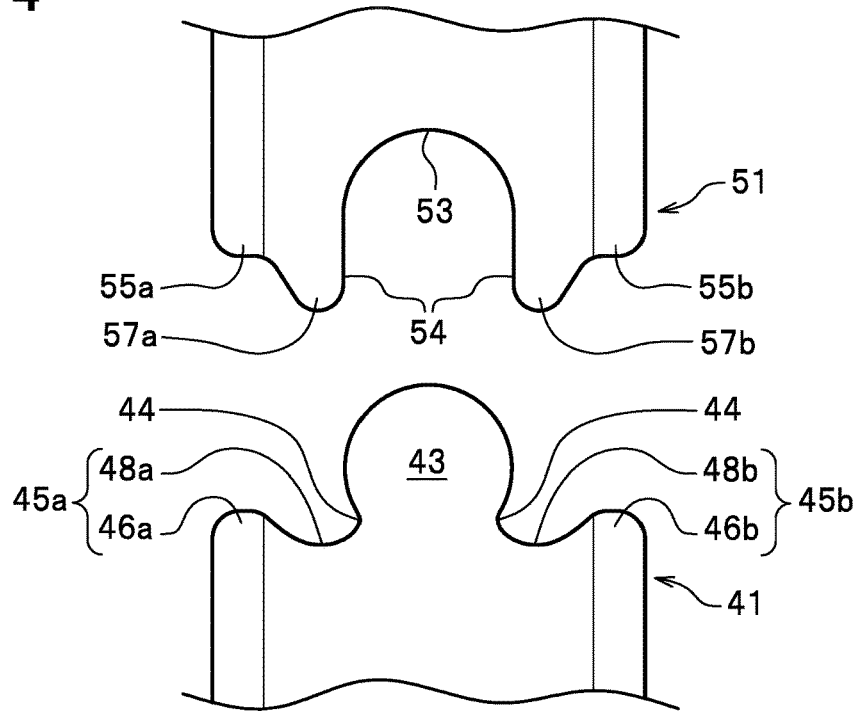
FIG. 14 is a diagram illustrating a state where the first and second lock portions are yet to engage with each other in a caulking step of performing a caulking process.

In a step of setting the stabilizer bar in Step S4 to be described later (see FIG. 13), the stabilizer bar 11 is set on an inner circumferential surface 31c of the first curved portion 35. In order for the stabilizer bar 11 to be stably set on the inner circumferential surface 31c of the first curved portion 35, a length L3 of the first curved portion 35 measured along its curve is set to be longer than a length L4 of the second curved portion 37 measured along its curve (FIG. 4) to increase the area in contact with the stabilizer bar 11. The radius of curvature of the first curved portion 35 is set to be equal to the radius of the stabilizer bar 11 (D/2) (see FIG. 3). Preferably, the length L3 of the first curved portion 35 measured along its curve is set to be more than a half of the length of the outer circumference of the stabilizer bar 11 (πD), namely, $$L3 \geq \pi D/2.$$

As shown in FIGS. 3 and 4, the inner circumferential surface 31c of the semi-finished product 31, to which the outer circumferential surface of the stabilizer bar 11 is contacted by pressure, is provided with the anti-slippage portion 38 with anti-slippage finishes to prevent slippage between the semi-finished product 31 and the stabilizer bar 11 attached to the semi-finished product 31.

The anti-slippage portion 38 provides slip resistance and is formed by many recesses depressed below the inner surface of the semi-finished product 31 by 30 μm to 700 μm, many projections protruding from the inner surface of the semi-finished product 31 by 30 μm to 700 μm, or many recesses and projections providing a surface roughness of 30 μm to 700 μm. The anti-slippage portion 38 is formed by a knurled pattern 38a. The groove depth of the knurled pattern 38a is 400 μm to 700 μm when the pattern is formed by die-pressing, and the groove depth of a product depends on the pressure applied.

To prevent displacement of the semi-finished product 31 during attachment of the semi-finished product 31 to the stabilizer bar 11, the anti-slippage portion 38 may additionally have an anti-slippage material Co (see FIG. 7), which is anti-slippage powder or an anti-slippage coating, applied to the inner circumferential surface 31c of the semi-finished product 31 where necessary. The anti-slippage material Co of the anti-slippage portion 38 is, for example, alumina powder. The anti-slippage portion 38 may be formed solely by the anti-slippage material Co. The anti-slippage material Co may be, for example, an anti-slippage coating containing alumina powder. If formed by an anti-slippage coating or anti-slippage powder, the anti-slippage material Co is formed with a film thickness of 30 μm to 40 μm.

In a caulking step in Step S7 to be described later (see FIG. 13) where the semi-finished product 31 is pressed and attached to the stabilizer bar 11, this 30 to 40 μm thick alumina powder applied as the anti-slippage material Co to the inner circumferential surface 31c of the semi-finished product 31 bites into the outer circumferential surface of the stabilizer bar 11, thereby increasing an anti-slippage effect to ensure that the movement restriction member 23 is not displaced in the axial direction of the stabilizer bar 11.

The first curved portion 35 (including a portion of the work in process 32 shown in FIG. 4 to be the first curved portion; the same is true hereinbelow) has a first lock portion 41 at an end portion thereof. As shown in FIGS. 2 to 5, the first lock portion 41 has a convex bulge portion 43 and first and second receiver portions 45a, 45b located on respective sides of the bulge portion 43 to sandwich the bulge portion 43. An end portion of the bulge portion 43 in the bulging direction is formed into an arc shape (substantially circular shape).

At its base end portion, the bulge portion 43 has a constricted portion 44 cut away in an arc shape on both sides. This constricted portion 44, together with first and second raised portions 57a, 57b to be described later, plays an important role in increasing the strength of engagement between the first lock portion 41 and a second lock portion 51. This will be described in detail later.

The first and second receiver portions 45a, 45b have first and second shoulder portions 46a, 46b, respectively, which are located at outer portions of the first lock portion 41 in its width direction and protruding in the bulging direction of the bulge portion 43. The first and second receiver portions 45a, 45b also have depressed first and second guide surfaces 48a, 48b, respectively, which extend from the first and second shoulder portions 46a, 46b toward the constricted portion 44 while curving in a direction opposite to the bulging direction of the bulge portion 43. The first and second guide surfaces 48a, 48b play an important role in guiding the respective first and second raised portions 57a, 57b, to be described later, to the depressed spaces formed by the constricted portion 44. This will be described in detail later.

The second curved portion 37 (including a portion of the work in process 32 shown in FIG. 4 to be the second curved portion; the same is true hereinbelow) has the second lock portion 51 at an end portion thereof. The second lock portion 51 is to engage with the first lock portion 41. Like the radius of curvature of the first curved portion 35, the radius of curvature of the second curved portion 37 is set to be equal to the radius of the stabilizer bar 11 (D/2) (see FIG. 3).

As shown in FIG. 6, the second lock portion 51 has a concave accommodation portion 53 capable of accommodating the bulge portion 43, and first and second protrusion portions 55a, 55b located at positions sandwiching the accommodation portion 53 (see FIG. 5). As shown in FIGS. 2 and 5, a deep portion of the accommodation portion 53 in the depressing direction of the accommodation portion 53 is formed into an arc shape (semi-circular shape) having the same diameter as the end portion of the bulge portion 43 in the bulging direction. The first and second protrusion portions 55a, 55b have the first and second raised portions 57a, 57b, respectively, which rise from respective end portions of the first and second protrusion portions 55a, 55b and returns toward an opening portion 54 of the accommodation portion 53 with their tips formed into semi-circular shapes.

In a width direction of the semi-finished product 31, a maximum dimension L5 of the bulge portion 43 shown in FIG. 5 is set to be equal to a maximum dimension L6 of the accommodation portion 53 shown in FIG. 6. This enables smooth accommodation of the bulge portion 43 into the space in the accommodation portion 53 when the first lock portion 41 and the second lock portion 51 engage with each other in a step of setting the second curved portion of the semi-finished product 31 in Step S6 to be described later (see FIG. 13).

As shown in FIGS. 5 and 6, in the bulging direction of the bulge portion 43, a height dimension L7 of the bulge portion 43 measured from the shoulder portions 46 is set to be equal to a depth dimension L8 of the accommodation portion 53 measured from the protrusion portions 55. A height dimension L10 of the raised portions 57 measured from the protrusion portions 55 is set to be larger than a recess depth dimension L9 of the guide surfaces 48. Thereby, when the first lock portion 41 and the second lock portion 51 engage with each other in the step of setting the second curved portion of the semi-finished product 31 in Step S6 to be described later (see FIG. 13), tip portions of the raised portions 57 abut against the depressed portions of the guide surfaces 48 before the tip portion the bulge portion 43 abuts against the deep portion of the accommodation portion 53.

As shown in FIG. 3, a gap L1 between the first and second lock portions 41, 51 is set to be larger than the diameter D of the stabilizer bar 11 (L1>D). This configuration enables smooth setting of the stabilizer bar 11 on the inner circumferential surface 31c of the first curved portion 35 without damaging the outer circumferential surface of the stabilizer bar 11, in the step of setting the stabilizer bar in Step S4 to be described later (see FIG. 13).

With reference to FIG. 4, the dimensions of the C-shaped semi-finished product 31 before being attached to the stabilizer bar 11 are described in more detail. The lower limit Sa [mm] and the upper limit Sb [mm] of the dimension S of a straight part of the bridge portion 33 on its inner surface side are expressed by $$Sa \geq L2 \times 0.18 - a, \text{ and}$$

$$Sb \geq L2 \times 0.18 + b$$

where L2 [mm] is the length dimension of the work in process 32 before being formed into the C shape, "0.18" is a coefficient, "a" is a constant for the lower limit Sa of the dimension of the straight part, and "b" is a constant for the upper limit Sb of the dimension of the straight part. The constant a is a=1 to 2, and the constant b is b=−2 to 3.

The constants a and b for the lower limit Sa and the upper limit Sb of the dimension S of the straight part somewhat differ depending on the types of the stabilizer bar 11 and the semi-finished product 31 with different thicknesses, sizes, or the like.

Actual examples are given to describe the lower limit Sa [mm] of the dimension S of the straight part. First, Type A of the semi-finished product 31 whose raw material for the movement restriction member 23 has the plate thickness T of 5 mm to less than 10 mm is considered. Since the constant a for the lower limit of the dimension S of the straight part of the bridge portion 33 on its inner surface side is a=1 to 2, the lower limit Sa [mm] of the dimension of the straight part is expressed by $$Sa \geq L2 \times 0.18 - (1 \text{ to } 2).$$

When the dimension S of the straight part of the bridge portion 33 on its inner surface side is set not to fall below such lower limit Sa, the semi-finished product 31 can be appropriately caulked around the stabilizer bar 11.

Secondly, Type B of the semi-finished product 31 whose raw material for the movement restriction member 23 has the plate thickness T of 3 mm to less than 5 mm is considered. Since the constant b for the upper limit of the dimension S of the straight part of the bridge portion 33 on its inner surface side is b=−2 to +3, the upper limit Sb [mm] of the dimension of the straight part is expressed by $$Sb \geq L2 \times 0.18 + (-2 \text{ to } +3).$$

In this case, it is desirable that the upper limit Sb [mm] of the dimension S of the straight part of the bridge portion 33 on its inner surface side be, for example, a value obtained by adding about 12.328 mm to 16.464 mm to the diameter D of the stabilizer bar 11.

When the dimension S of the straight part of the bridge portion 33 on its inner surface side is set to such upper limit Sb, the C-shaped semi-finished product 31 can be appropriately caulked around the stabilizer bar 11 inserted in the semi-finished product 31, because the first and second curved portions 35, 37 come into tight contact with the outer circumferential surface of the stabilizer bar 11.

The semi-finished product 31 thus formed with the dimension S within the range of the lower limit Sa to the upper limit Sb has an appropriate length for the part thereof to be bent and curved. Thus, when the C-shaped semi-finished product 31, having the stabilizer bar 11 inserted therein, is pressed and caulked in closing directions, the first lock portion 41 and the second lock portion 51 at both ends of the semi-finished product 31 can always engage with each other. This enables enhancement in production efficiency and productivity for the semi-finished products 31, as well as elimination of defective products.

Actual examples are given to describe the dimension S [mm] of the straight part. For Type A of the semi-finished product 31 whose raw material for the movement restriction member 23 has the plate thickness T (see FIG. 3) of 5 mm to less than 10 mm, the dimension S [mm] of the straight part is expressed by $$S = L2 \times 0.18 + (-2 \text{ to } +2), \text{ or}$$

$$L2 \times 0.18 - 2 \leq S \leq L2 \times 0.18 + 2.$$

If the dimension L2 [mm] between the first lock portion 41 and the second lock portion 51 on the other end is L2=79.6, the dimension S [mm] of the straight part is $$12.328 \leq S \leq 16.328.$$

For Type B of the semi-finished product 31 whose plate thickness T is 3 mm to less than 5 mm, the dimension S [mm] of the straight part is expressed by $$S = L2 \times 0.18 + (-1 \text{ to } +3), \text{ or}$$

$$L2 \times 0.18 - 1 \leq S \leq L2 \times 0.18 + 3.$$

If the dimension L2 [mm] between the first lock portion 41 and the second lock portion 51 on the other end is L2=74.8, the dimension S [mm] of the straight part is $$12.464 \leq Sb \leq 16.464.$$

Thus, the constant b for the upper limit of the dimension S of the straight part is $$b = -2 \text{ to } 3$$

because the smallest value is "−2" of Type A and the largest value is "+3" of Type B.

For Type A, the plate thickness of the raw material is 6 mm, and the plate thickness changes to 5 mm after knurling and to 4 mm after caulking. For Type B, the plate thickness of the raw material is 4 mm, and the plate thickness changes to 3.2 mm after knurling and to 3 mm after caulking.

In the C-shaped semi-finished product 31, shown in FIG. 3, unattached to the stabilizer bar 11, the dimension L1 between the first lock portion 41 and the second lock portion 51 is set to $$L1 = S + (D/2 \times \cos \theta)$$

where D is the diameter of the stabilizer bar 11, θ is an angle at the center of the second curved portion 37 between the tip of the second lock portion 51 and a center line O1-O2 connecting a center O1 of the first curved portion 35 and a center O2 of the second curved portion 37, and L11 is the length between the tip of the second lock portion 51 and the center O2 of the second curved portion 37 measured along the center line O1-O2.

Thus, the distance L11 between the tip of the second lock portion 51 and the center O2 of the second curved portion 37 measured along the center line O1-O2 is set to $$L11 = D/2 \times \cos \theta.$$

<<Forging Die Apparatus>>

FIGS. 7 to 12 are diagrams schematically showing the structure of a forging die apparatus 60 and how the forging die apparatus 60 is used.

Figure 7:
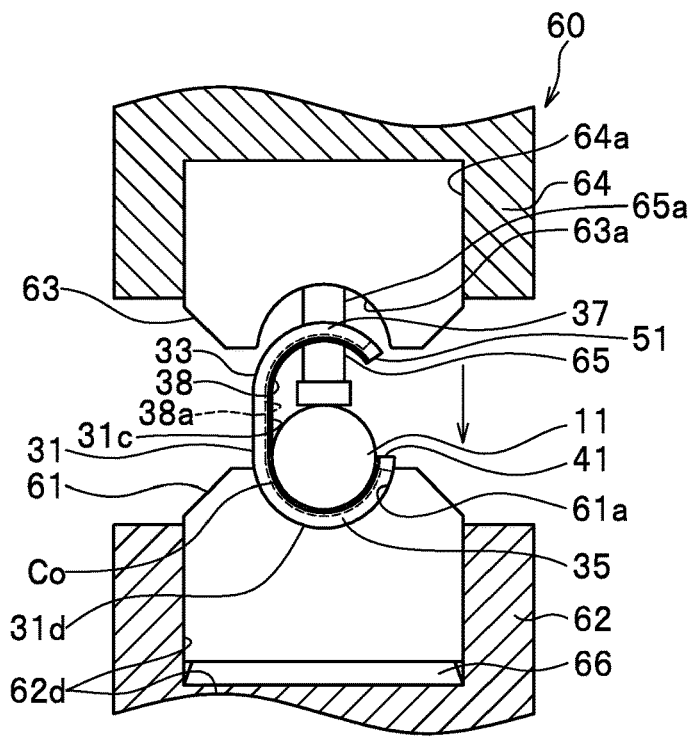
FIG. 7 is a partially-sectional, schematic side view of a main part of a forging die apparatus, showing how the semi-finished product for the movement restriction member is attached to the stabilizer bar.
Figure 8:
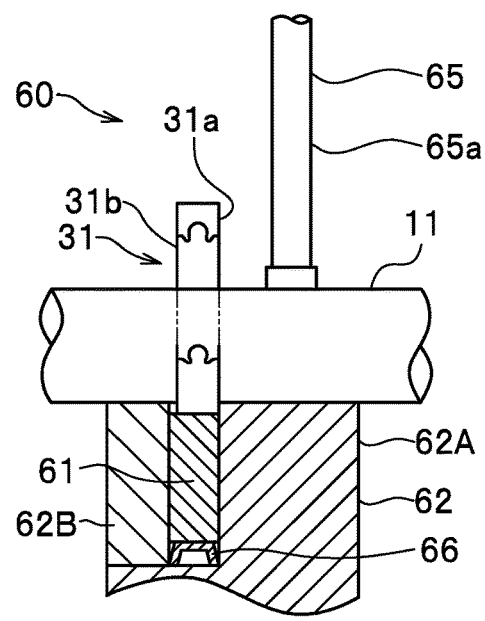
FIG. 8 is a partially-sectional, schematic front view of a main part showing how a displacement preventer is provided to the forging die apparatus.

As shown in FIG. 7, the forging die apparatus 60 (an apparatus for attaching a semi-finished product) is a vertical forging press configured to caulk the semi-finished product 31 of the movement restriction member 23 (see FIG. 1) using a first die 61 and a second die 63 to attach the semi-finished product 31 to the stabilizer bar 11. The forging die apparatus 60 includes, for example, the first die 61 configured to support the semi-finished product 31 from below, the second die 63 configured to press the semi-finished product 31 placed on the first die 61 from above to shape the semi-finished product 31, a first die holder 62 configured to hold the first die 61, a second die holder 64 configured to hold the second die 63, a vertical mover (not shown) configured to elevate or lower the first die 61, a displacement preventer 65 configured to prevent the semi-finished product 31 from slipping out of place relative to the first die 61 when the semi-finished product 31 is caulked to be attached on the stabilizer bar 11, and a jig 80 (see FIGS. 9 and 10) configured to hold the first die holder 62 while allowing the first die holder 62 to rotate. This forging die apparatus 60 can switch the position of the first die holder 62 held by the jig 80 between an inside-dimension positioning state and an outside-dimension positioning state, so that both inside-dimension positioning and outside-dimension positioning can be performed with this single forging die apparatus 60.

<<Dies>>

As shown in FIG. 7, the dies used by the forging die apparatus 60 are forging dices consisting of the first die 61 which is a stationary lower die configured to support the semi-finished product 31 from below to form the lower surface side and the second die 63 which is a movable upper die configured to bend the upper surface side by applying pressure to the semi-finished product 31 from above to compress the semi-finished product 31.

As shown in FIG. 7, the first die 61 is a lower-surface forming die having a cavity 61a on which the semi-finished product 31 to be forged is placed. The first die 61 is bolted to the first die holder 62 in a horizontal state.

The cavity 61a is formed as a semi-circular groove extending in the left-right direction and being capable of accommodating the first curved portion 35 of the semi-finished product 31 of the movement restriction member 23 (see FIG. 1) with no space interposed between the cavity 61a and the outer shape of the first curved portion 35.

Figure 18:
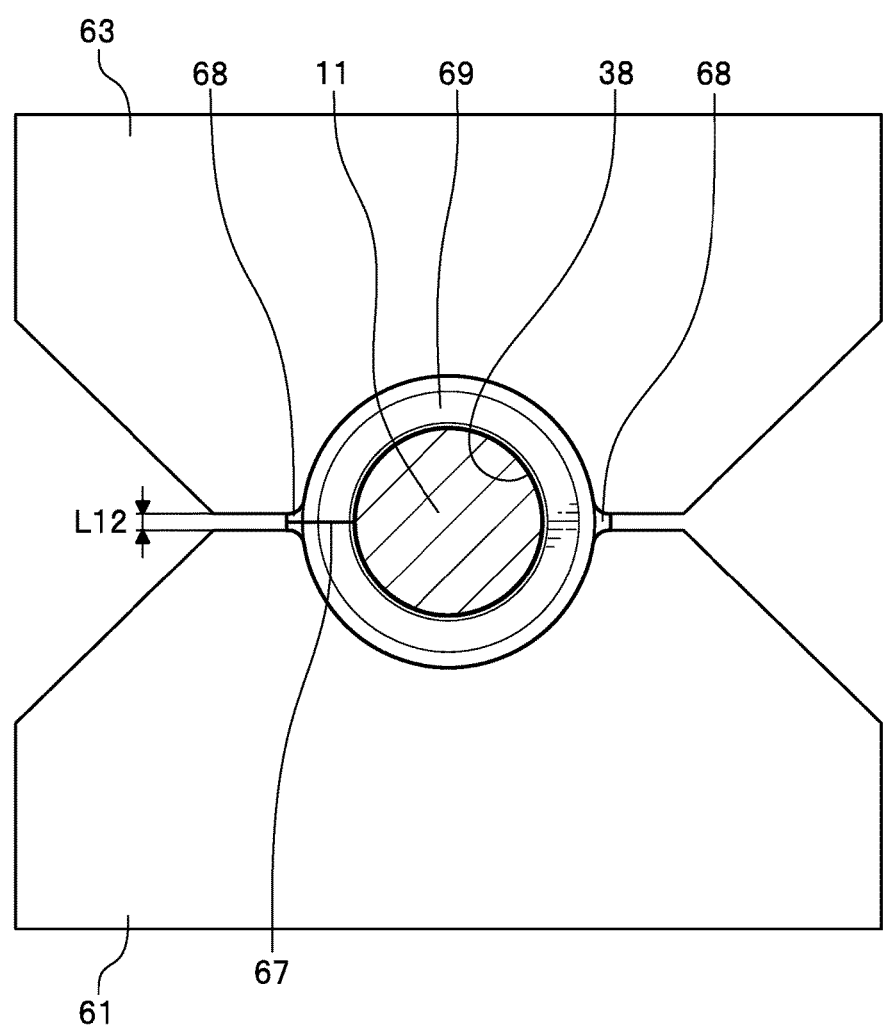
FIG. 18 is a diagram illustrating the semi-finished product for the movement restriction member pressingly deformed in the caulking step with a space for burr formation left between the first and second dies.

The second die 63 is an upper-surface forming die configured to press and plastically deform the upper surface side of the semi-finished product 31 when lowered by the vertical mover (not shown). The second die 63 is bolted to the second die holder 64 in a horizontal state facing the first die 61. The second die 63, too, has a cavity 63a which is a semi-circular groove capable of accommodating the second curved portion 37 of the semi-finished product 31 of the movement restriction member 23 (see FIG. 1) with no space interposed between the cavity 63a and the outer shape of the second curved portion 37. As shown in FIG. 18, when caulking the semi-finished product 31 (the caulking step in Step S7), the second die 63 presses the semi-finished product 31 by being lowered by the vertical mover (not shown) toward the first die 61 to a position where a gap L12 is interposed between the first die 61 and the second die 63.

<<Die Holder>>

As shown in FIG. 7, the die holders (62, 64) are fixtures that hold the first die 61 and the second die 63, and fix them to the forging die apparatus 60. These die holders consist of the first die holder 62 configured to hold the lower first die 61 and the second die holder 64 configured to hold the upper second die 63.

<First Die Holder>

Figure 10:
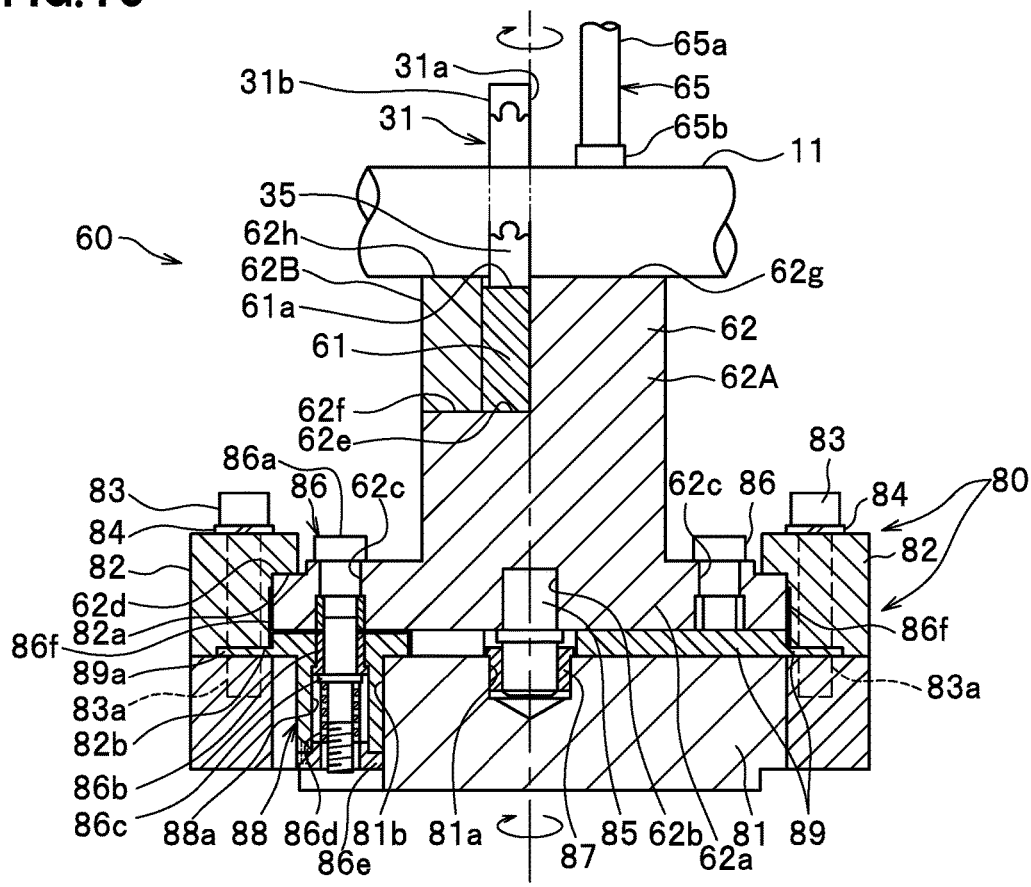
FIG. 10 is a schematic cross-sectional view of a main part of the forging die apparatus when caulking is performed with reference to the inner surface of the semi-finished product for the movement restriction member.

As shown in FIG. 10, the first die holder 62 is set on the jig 80, which is located on a base (not shown) of the forging die apparatus 60, to fix the first die 61 at a predetermined position on the base (not shown) via the jig 80. The first die holder 62 consists mainly of a first main die holder 62A turnably fixed onto the jig 80 with fasteners 83 and a first sub die holder 62B attached onto the first main die holder 62A.

The first main die holder 62A is a member on which the first die 61, the first sub die holder 62B, and the stabilizer bar 11 are placed and held. The first main die holder 62A includes a substantially disc-shaped jig mount portion 62a rotatably mounted on the jig 80, a rotary-shaft installation hole 62b in which a rotary shaft 85 is to be installed, positioning-member installation holes 62c, 62c in which positioning members 86, 86 are to be attached, a support portion 62d fixed by fixation blocks 82, a die placement portion 62e on which the first die 61 is to be placed, a sub-die-holder placement portion 62f on which the first sub die holder 62B is placed, and bar support portions 62g, 62h each formed as a groove having an arc shape in longitudinal section and configured to support the stabilizer bar 11.

Figure 9:
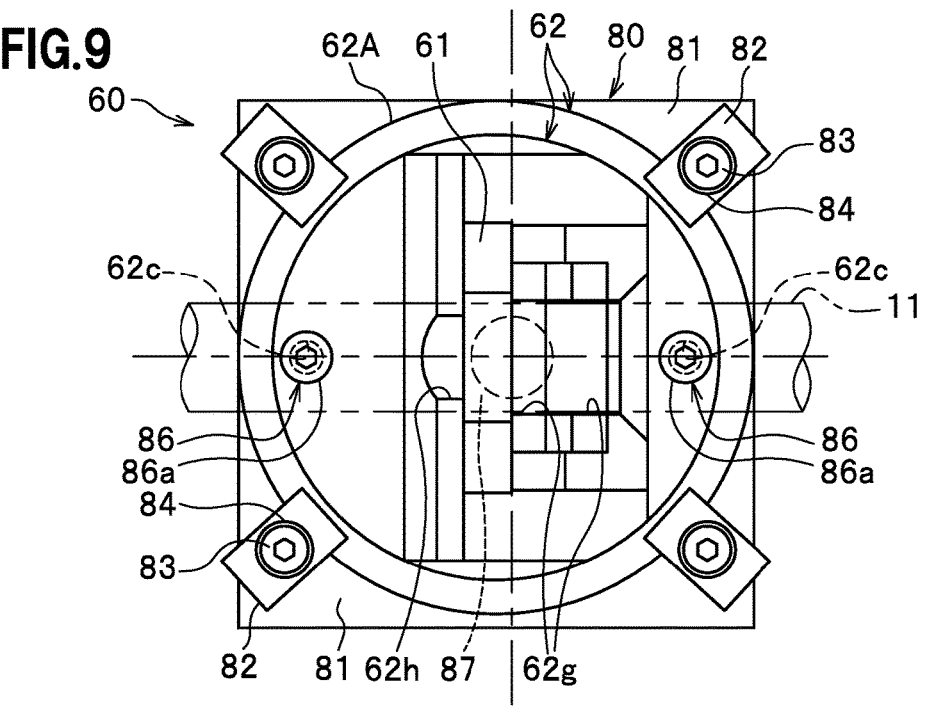
FIG. 9 is a schematic plan view of a first die and a first die holder of the forging die apparatus when caulking is performed with reference to an inner surface of the semi-finished product for the movement restriction member.

As shown in FIGS. 9 and 10, the jig mount portion 62a has the rotary-shaft installation hole 62b formed in a center portion of the lower surface of the jig mount portion 62a, the positioning-member installation holes 62c, 62c formed on the left and right parts of the jig mount portion 62a, respectively, and the stepped support portion 62d formed as the outer circumferential portion of the jig mount portion 62a.

The first sub die holder 62B, together with the first main die holder 62A, sandwiches the first die 61 placed on the die placement portion 62e of the first main die holder 62A. The first sub die holder 62B is fixed to the first main die holder 62A by a fastening member (not shown).

<Second Die Holder>

As shown in FIG. 7, the second die holder 64 is set below a pressing part (not shown) of the forging die apparatus 60 and holds the upper second die 63. The second die holder 64 has a second-die holding portion 64a and is elevated or lowered by the vertical mover (not shown) along with the second die 63.

The vertical mover (not shown) is a device that lowers the second die 63 via the second die holder 64 shown in FIG. 7 to press, with the second die 63, the semi-finished product 31 set on the first die 61 so that the semi-finished product 31 is caulked and attached on the stabilizer bar 11. This vertical mover (not shown) elevates or lowers the second die 63 vertically by hydraulic actuation or the like.

<Displacement Preventer>

As shown in FIGS. 7 and 10, the displacement preventer 65 is a device that prevents the semi-finished product 31 set on the cavity 61a of the first die 61 from slipping out of place relative to the first die 61 when the semi-finished product 31 set on the first die 61 is attached to the stabilizer bar 11 by caulking. The displacement preventer 65 is provided, for example, at the second die holder 64 holding the second die 63, or somewhere in the forging die apparatus 60 near the second die holder 64. The displacement preventer 65 is formed by a gas spring 65a configured to press the stabilizer bar 11, extending from the first die 61, toward the first die 61 with the semi-finished product 31 interposed therebetween, so that the semi-finished product 31 may be held without moving out of place from the cavity 61a (first engagement concave portion) of the first die 61.

The gas spring 65a includes a cylinder portion (not shown) in which high-pressure gas is sealed, and a piston rod 65b which is slidably inserted into the cylinder portion and configured to be extended downward by the pressure of the high-pressure gas to press the stabilizer bar 11.

It should be noted that the gas spring 65a shown in FIGS. 7, 8, 10, and 12 is schematically illustrated, and the structure, installation position, the number, and the like of the gas spring 65a are not limited. Specifically, there may be more than one gas spring 65a configured to press the stabilizer bar 11 toward the first die 61, so as to press the stabilizer bar 11 at multiple locations. The location on the stabilizer bar 11 pressed by the gas spring 65a may be changed appropriately.

<Jig>

Figure 11:
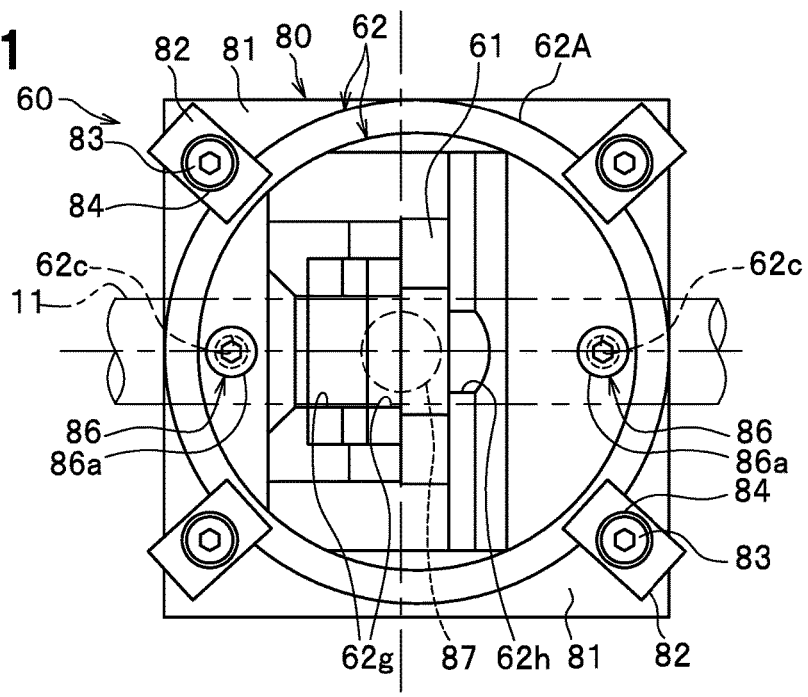
FIG. 11 is a schematic plan view of the first die and the first die holder of the forging die apparatus when caulking is performed with reference to an outer surface of the semi-finished product for the movement restriction member.
Figure 12:
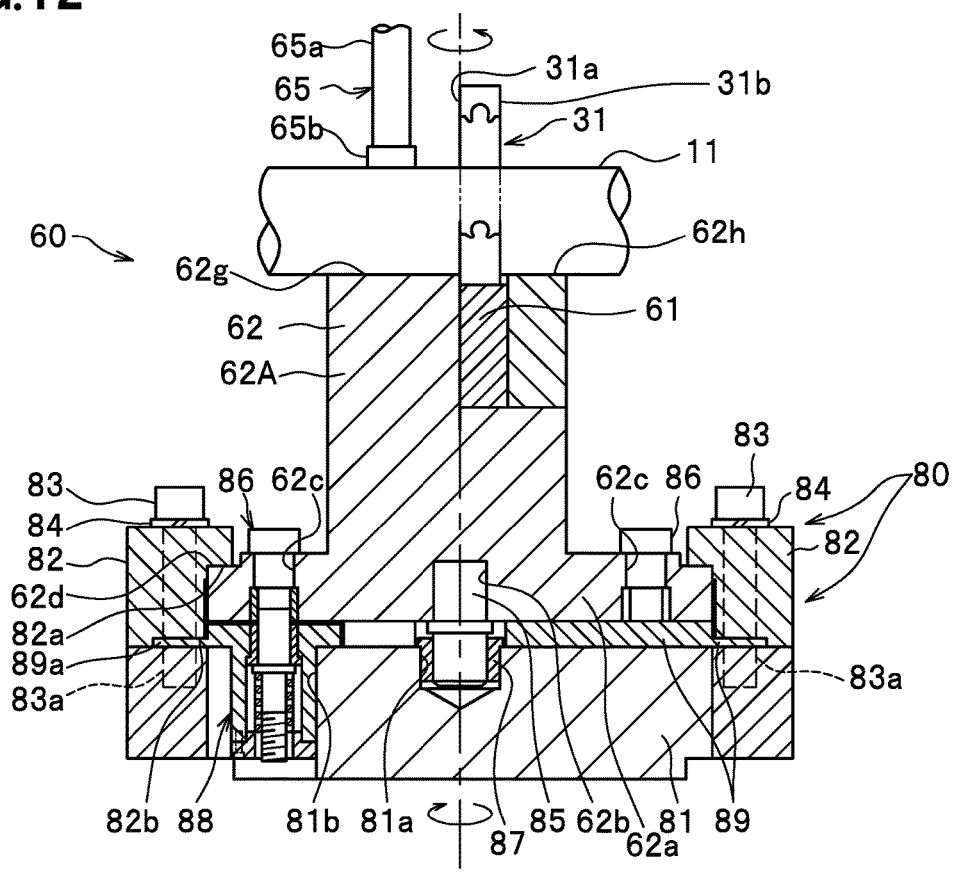
FIG. 12 is a schematic cross-sectional view of a main part of the forging die apparatus when caulking is performed with reference to the outer surface of the semi-finished product for the movement restriction member.

The jig 80 is a positioning fixture configured to switch the position to hold the first die 61 between an inside-dimension determination position and an outside-dimension determination position by turning the first die holder 62 to either position. Specifically, as shown in FIGS. 9 and 10, the jig 80 turns the first die holder 62 to the inside-dimension determination position and fixes the first die holder 62 there when the semi-finished product 31, which is one of the paired left and right semi-finished products 31 to be attached to the stabilizer bar 11, is caulked using the first die 61 and the second die 63 with reference to an inner surface 31a of the semi-finished product 31 facing the other one of the paired semi-finished products 31. As shown in FIGS. 11 and 12, the jig 80 turns the first die holder 62 to the outside-dimension determination position and fixes the first die holder 62 there when the semi-finished product 31 is caulked by reference to an outer surface 31b of the left and right semi-finished products 31.

The jig 80 includes a jig main body 81 placed on the base (not shown) of the forging die apparatus 60, the fixation blocks 82 fastened to an outer peripheral portion of the jig main body 81, the fasteners 83 configured to fasten the corresponding fixation blocks 82 to the jig main body 81, washers 84 interposed between the fasteners 83 and the fixation blocks 82, the rotary shaft 85 serving as the center of rotation when the jig main body 81 is rotated, the positioning members 86 configured to fix the first main die holder 62A to a predetermined position on the jig main body 81, a bearing member 87 configured to pivotally support the rotary shaft 85, guide members 88 configured to support the respective positioning members 86, and a support plate 89 interposed between the jig main body 81 and the first main die holder 62A and between the jig main body 81 and the fixation blocks 82.

When the fasteners 83 are loosened, the jig 80 can be turned 180° from the inside-dimension positioning state, shown in FIGS. 9 and 10, using the inner surface 31a of the semi-finished product 31 as reference to the outside-dimension positioning state, shown in FIGS. 11 and 12, using the outer surface 31b of the semi-finished product 31 as reference. Then, the jig 80 can be fixed at that position.

As shown in FIG. 10, the jig main body 81 is formed by a rectangular block, in a plan view, detachably fastened onto the base (not shown) of the forging die apparatus 60. The jig main body 81 has a bearing installation hole 81a which is formed at a center part of the upper surface of the jig main body 81 and into which the substantially tubular bearing member 87 pivotally supporting the rotary shaft 85 is fitted, guide-member installation holes 81b into which the guide members 88 are fitted, and female threaded portions (not shown) into which male threaded portions 83a of the fasteners 83 are screwed.

As shown in FIG. 10, the fixation blocks 82 are four members each detachably fastened onto corresponding one of the four corners of the jig main body 81, and are fixed to the jig main body 81 with the corresponding fasteners 83 while holding an outer peripheral portion of the support portion 62d of the first main die holder 62A from four directions, respectively. Each fixation block 82 has a retainer portion 82a configured to press down the support portion 62d of the first main die holder 62A when the fixation block 82 is fixed to the jig main body 81 by the fastener 83, a notched portion 82b configured to support, from above, a corresponding one of protrusions 89a of the support plate 89 placed on the jig main body 81, and a through-hole (not shown) which is formed through this notched portion 82b and into which the male threaded portion 83a of the fastener 83 is inserted.

To turn the first die holder 62, the four fasteners 83 are loosened to release the fixation blocks 82 holding the jig main body 81 so that the first main die holder 62A can turn relative to the jig main body 81. To fix the first main die holder 62A securely to the jig main body 81, the fasteners 83 are turned in a fastening direction so that the male threaded portions 83a thereof are screwed into the female threaded portions (not shown) in the jig main body 81, securing the fixation blocks 82 to the jig main body 81.

The washers 84 are spring washers serving to prevent looseness of the fasteners 83 fastening the fixation blocks 82 to the jig main body 81.

As shown in FIG. 10, the rotary shaft 85 is a substantially solid-cylindrical shaft member having an annular flanged portion formed around a vertically center portion of the rotary shaft 85. The upper portion of the rotary shaft 85 is inserted into the rotary-shaft installation hole 62b of the first main die holder 62A, and the lower portion of the rotary shaft 85 is rotatably inserted into the bearing member 87.

The positioning members 86 are configured to determine the position of the first main die holder 62A on the jig main body 81 at the position corresponding to a predetermined reference surface (the inner surface 31a or the outer surface 31b of the semi-finished product 31), when the first main die holder 62A is fixed to the jig main body 81.

The positioning members 86 each include a positioning bolt 86a configured to be placed in a predetermined position in the corresponding guide member 88 to detachably fix the first die holder 62 to a position using the inner surface 31a or the outer surface 31b of the semi-finished product 31 as reference, collars 86b, 86b in which the positioning bolt 86a is turnably fitted, an annular member 86c fitted around the positioning bolt 86a and locks with a lower step portion of the positioning bolt 86a formed at a substantially center portion of the positioning bolt 86a, a coil spring 86d fitted around the positioning bolt 86a with a gap interposed therebetween and configured to bias the positioning bolt 86a upward via the annular member 86c and the collars 86b, 86b, a spring bearing 86e configured to receive the coil spring 86d from below, and a sliding contact member 86f formed by a low-friction sliding sheet interposed between the fixation block 82 and the jig mount portion 62a as well as the guide member 88 and between the jig mount portion 62a and the guide member 88.

The positioning member 86 is inserted into the corresponding positioning-member installation hole 62c in the jig mount portion 62a and further into a spring-member insertion hole 88a in the corresponding guide member 88, so that a male threaded portion formed on the positioning member 86 at a lower portion thereof is screwed into a female threaded portion formed on the spring bearing 86e.

The positioning bolt 86a is not limited in its shape or type and may be a fixture other than a bolt, as long as it is attachable to and detachable from the first die holder 62 and the jig 80.

The bearing member 87 is formed by, for example, a slide bearing inserted into the bearing installation hole 81a at a center portion of the upper surface of the jig main body 81.

The guide members 88 hold the respective positioning members 86 via the collars 86b. Under predetermined positions on the lower surface of the first die holder 62, the guide members 88 respectively engage with the guide-member installation holes 81b formed in the jig main body 81 at predetermined left and right positions on the jig main body 81.

The support plate 89 is a plate-shaped member whose center part is interposed between the jig main body 81 and the first main die holder 62A. The support plate 89 has the washer-shaped support protrusions 89a formed at an outer peripheral portion of the support plate 89 and interposed between the corresponding fixation blocks 82 and the jig main body 81, and through-holes in which the bearing member 87 and the flanged portions of the guide members 88 are placed.

<<Operation>>

Referring mainly to FIGS. 13 to 18, descriptions are given of a method of attaching the semi-finished product 31 of the movement restriction member 23 according to the embodiment of the present invention to the stabilizer bar 11 (bar member) and operation of the forging die apparatus 60 (apparatus for attaching a semi-finished product and the structure for attachment of the semi-finished product). The attachment work is carried out in the order of the steps shown in FIG. 13.

<Preparation Step>

First, a description is given assuming that, as shown in FIGS. 9 and 10, each of the left and right semi-finished products 31 of the movement restriction members 23 (see FIG. 1) is attached to the stabilizer bar 11 according to the inside-dimension positioning using the inner surface 31a thereof facing the other semi-finished product 31 as reference. First, in a preparation step (Step S1), the first die holder 62 is turned to the inside-dimension determination position for holding the first die 61 and is fastened at its outer peripheral portion with the four fixation blocks 82 using the fasteners 83 to be fixed to the jig main body 81 of the jig 80 with the fixation blocks 82.

Next in this preparation step (Step S1), the first die 61 is placed on the die placement portion 62e of the first main die holder 62A, and the first die 61 is sandwiched and held by the first main die holder 62A and the first sub die holder 62B. Additionally, the second die 63 is fixed to the second die holder 64, as shown in FIG. 7.

<Step of Setting the First Curved Portion of the Semi-Finished Product>

Next, a step of setting the first curved portion of the semi-finished product 31 (Step S2) is performed. In this step, the first curved portion 35 of the semi-finished product 31 of the movement restriction member 23 (see FIG. 1) is set on the cavity 61a of the first die 61. The first curved portion 35 of the semi-finished product 31 can be held by the cavity 61a by just being placed on the cavity 61a because the first curved portion 35 and the cavity 61a are equally substantially semicircular. Thus, this setting step can be performed easily without any special positioning or holding member.

<Step of Applying Anti-Slippage Material>

Next, if displacement of the semi-finished product 31 is likely in the caulking step (Step S7) of attaching the semi-finished product 31 to the stabilizer bar 11, which will be described later, a step of applying the anti-slippage material (Step S3) is performed beforehand to increase displacement prevention effect. In this step, the anti-slippage material Co is interposed between the inner circumferential surface 31c of each of the first and second curved portions 35, 37 and the outer circumferential surface of the stabilizer bar 11, where necessary. For example, the anti-slippage material Co containing alumina powder or the like is applied to the knurled pattern 38a formed on the inner circumferential surface 31c of the semi-finished product 31 facing the outer circumferential surface of the stabilizer bar 11.

The step of applying the anti-slippage material (Step S3) is unnecessary if displacement of the semi-finished product 31 is unlikely in the caulking step (Step S7). When the step of applying the anti-slippage material (Step S3) is unnecessary, the step of setting the first curved portion of the semi-finished product 31 (Step S2) is followed by the step of setting the stabilizer bar (Step S4).

<Step of Setting the Stabilizer Bar>

In the step of setting the stabilizer bar (Step S4), with the first curved portion 35 of the semi-finished product 31 of the movement restriction member 23 (see FIG. 1) being set on the cavity 61a of the first die 61, the stabilizer bar 11 is made to pass through the gap L1 between the first and second lock portions 41, 51 (see FIG. 3) and set on the inner circumferential surface 31c of the first curved portion 35.

<Step of Pressing Stabilizer Bar>

Next, before the caulking of the semi-finished product 31 set on the lower first die 61, the stabilizer bar 11 is pressed by the gas spring 65a of the displacement preventer 65 toward the first curved portion 35 on the first die 61 with the semi-finished product 31 interposed therebetween as shown in FIG. 7, so that the semi-finished product 31 can be securely pressed to a predetermined set position on the first die 61 and held immovably (Step S5).

This step of pressing the stabilizer bar 11 to the first die 61 with the semi-finished product 31 interposed therebetween before the semi-finished product 31 is caulked and attached on the stabilizer bar 11 prevents the semi-finished product 31 from being caulked at a displaced position on the stabilizer bar 11, so that defective products may not be produced. The semi-finished product 31 can also be caulked and fixed on the stabilizer bar 11 in a predetermined state.

<Step of Setting the Second Curved Portion>

Next, a step of setting the second curved portion of the semi-finished product 31 is performed (Step S6). In this step, the second curved portion 37 of the semi-finished product 31 of the movement restriction member 23 (see FIG. 1) is set in the second die 63. This completes the setting steps performed prior to attachment of the semi-finished product 31 of the movement restriction member 23 to the stabilizer bar 11.

<Caulking Step>

Next, the caulking step is performed (Step S7). In the caulking step, with the semi-finished product 31 of the movement restriction member 23 being set between the first die 61 and the second die 63, the movable second die 63 is vertically lowered by the vertical mover (not shown) toward the stationary first die 61 to press the second die 63 against the first die 61, so that the second curved portion 37 is bent and caulked around the stabilizer bar 11 (clinching). The semi-finished product 31 can be attached to the stabilizer bar 11 by this caulking which involves pressure-contacting of the inner circumferential surfaces 31c of the bridge portion 33, the first curved portion 35, and the second curved portion 37 onto the outer circumferential surface of the stabilizer bar 11 in a wrapping manner and causing the first and second lock portions 41, 51 to engage with each other.

Figure 15:
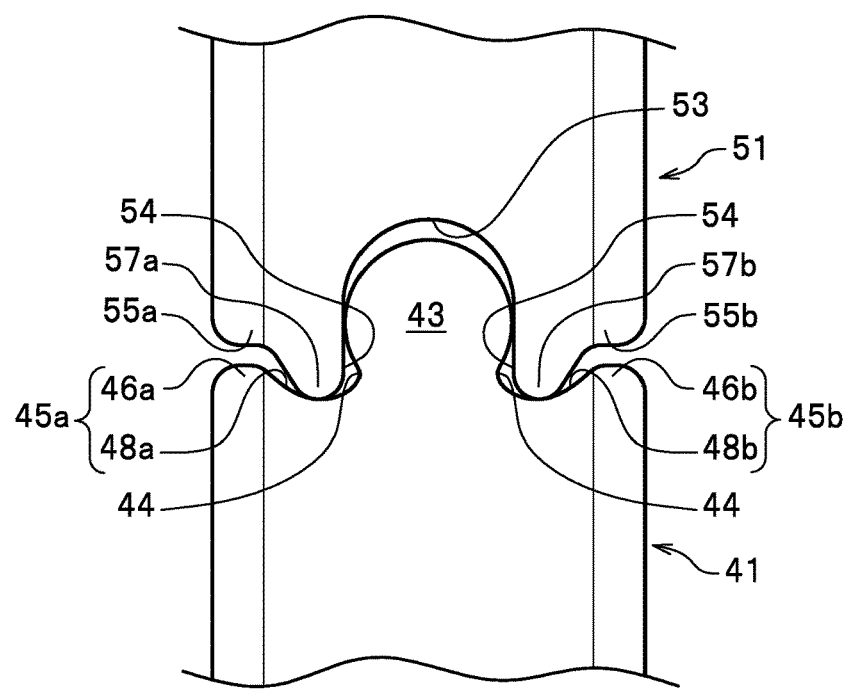
FIG. 15 is a diagram illustrating a state where tip portions of raised portions have abutted against depressed portions of guide surfaces in the caulking step of performing a caulking process.

In this caulking step of performing a caulking process (Step S7), when pressing forces for the caulking are applied with the first and second lock portions 41, 51 facing each other (see FIG. 14), the bulge portion 43 is accommodated in the accommodation portion 53, and the first and second raised portions 57a, 57b come into contact with the first and second guide surfaces 48a, 48b of the first and second receiver portions 45a, 45b, respectively (see FIG. 15).

Figure 16:
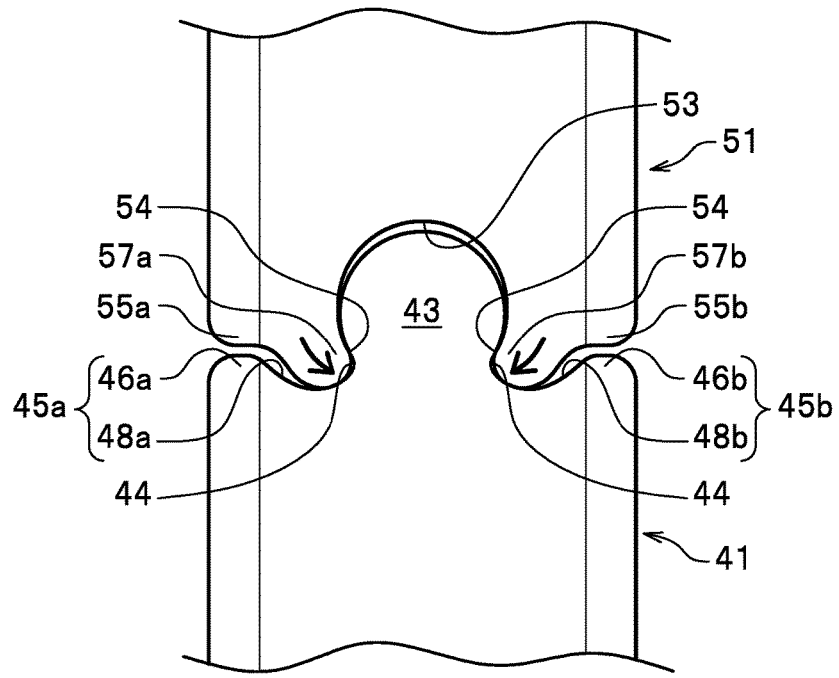
FIG. 16 is a diagram illustrating how the raised portions, compressed by the guide surfaces, plastically deform and fill spaces on both sides of a constricted portion in the caulking step of performing a caulking process.
Figure 17:
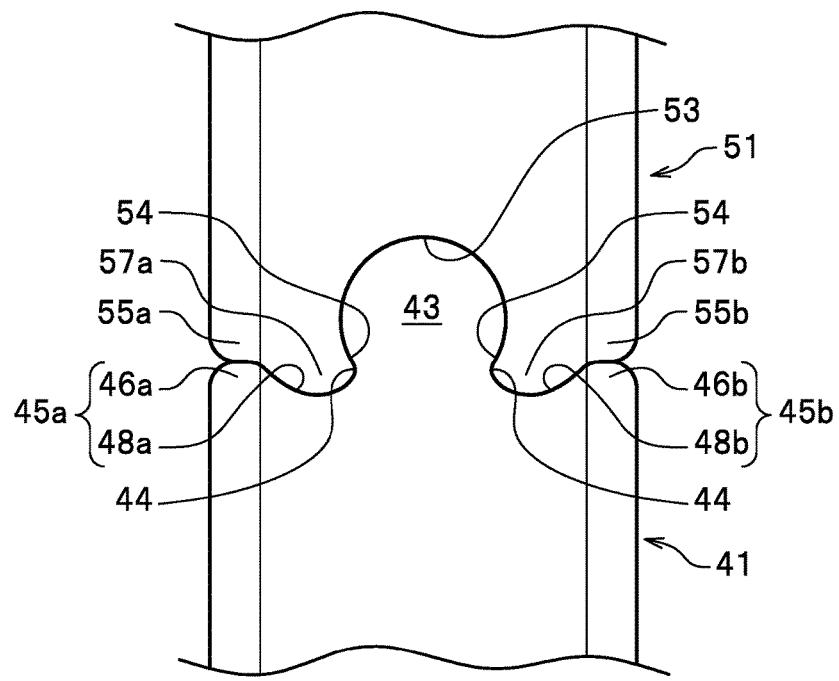
FIG. 17 is a diagram illustrating the first and second lock portions engaging with each other in the step of performing a caulking process.
Figure 19:
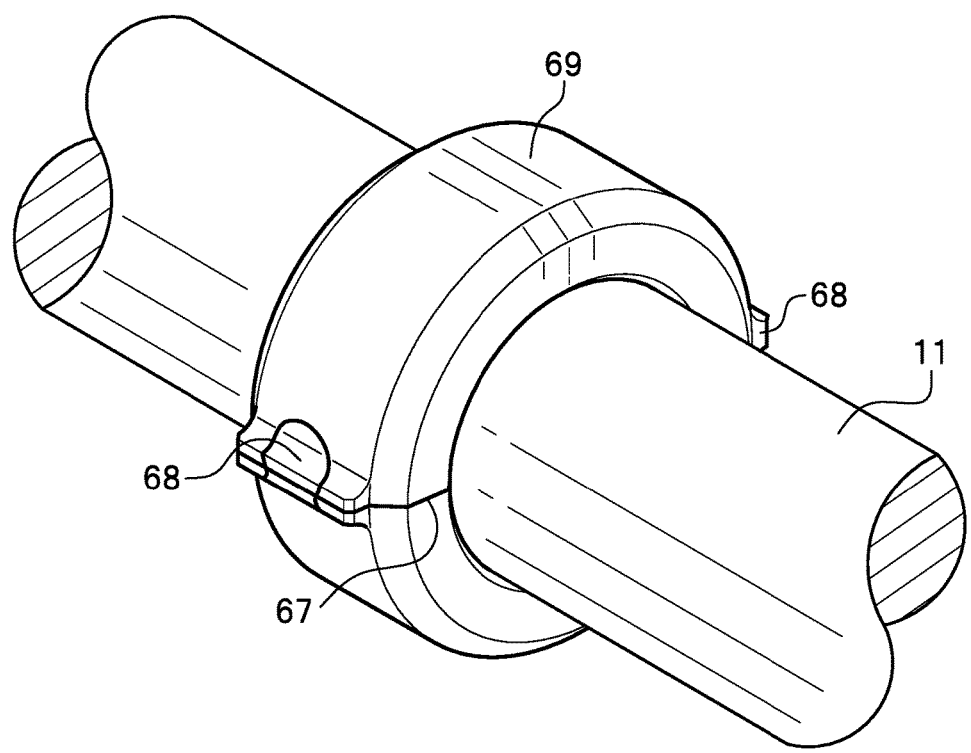
FIG. 19 is a perspective view showing the semi-finished product for the movement restriction member pressingly deformed in the caulking step with the space for burr formation left between the first and second dies.

Then, the first and second raised portions 57a, 57b, compressed by the first and second guide surfaces 48a, 48b which are continuous with the first and second shoulder portions 46a, 46b, plastically deform inward in the width direction of the first lock portion 41 to embed the depressed spaces defined respectively by the first and second guide surfaces 48a, 48b and the constricted portion 44 (see FIG. 16). As a result, the plastically deformed first and second raised portions 57a, 57b fill the depressed spaces, embedding the depressed spaces tightly without any space. Through the steps described above, the semi-finished product 31 of the movement restriction member 23 is securely attached to the stabilizer bar 11 as a finished product 69 (see FIGS. 18 and 19).

In the caulking step (Step S7), the semi-finished product 31 of the movement restriction member 23 is deformed under pressure applied with an engagement portion 67 of the first and second lock portions 41, 51 being located near the border between the first and second dies 61, 63, until the gap L12 for burr formation (see FIG. 18) is left between the first and second dies 61, 63. This produces a burr portion 68 which is formed on an outer wall of the engagement portion 67 and transversely extends in the width direction of the semi-finished product 31 (see FIGS. 18 and 19). A burr such as the burr portion 68 protrudes in the front-rear and left-right directions by about 3 mm to 5 mm. The additional plastic deformation at the engagement portion 67 increases the strength of engagement between the first and second lock portions 41, 51 even more.

In the semi-finished product 31 of the movement restriction member 23 to be attached to the outer circumferential surface of the stabilizer bar 11 by caulking in the caulking step (Step S7), the knurled pattern 38a is formed on the inner circumferential surface 31c of the semi-finished product 31 facing the outer circumferential surface of the stabilizer bar 11, as shown in FIG. 7.

The knurled pattern 38a formed by 30 μm to 700 μm recesses or projections enhances the biting effect between the inner circumferential surface 31c of the semi-finished product 31 and the outer circumferential surface of the stabilizer bar 11 because the recesses or projections, when crushed into appropriate sizes by the pressure applied upon the caulking, bring about an anchor effect of increasing frictional resistance at a portion in tight contact with the outer circumferential surface of the stabilizer bar 11. This anchor effect allows the semi-finished product 31 and the stabilizer bar 11 to be firmly attached to each other.

If the step of applying the anti-slippage material (Step S3) is performed, both the knurled pattern 38a and the anti-slippage material Co, such as alumina powder, are relatively formed between the inner circumferential surface 31c of the semi-finished product 31 and the outer circumferential surface of the stabilizer bar 11. Thus, pressure applied in the caulking step (Step S7) attaches the recesses or projections of the anti-slippage portion 38 to the anti-slippage material Co which is a coating interposed between the inner circumferential surface 31c of the semi-finished product 31 and the outer circumferential surface of the stabilizer bar 11, forming a fine fitting structure. This fine fitting structure makes the semi-finished product 31 and the stabilizer bar 11 be fixed to each other, enabling their firm attachment.

As shown in FIG. 10, when the semi-finished product 31 of the movement restriction member 23 set on the first die 61 is caulked and attached on the stabilizer bar 11 using the first die 61 and the second die 63, the stabilizer bar 11 placed on the inner circumferential surface 31c of the first curved portion 35 of the movement restriction member 23 (see FIG. 7) set on the cavity 61a of the first die 61 is pressed by the gas spring 65a of the displacement preventer 65 against the first curved portion 35 of the first die 61 with the semi-finished product 31 interposed therebetween.

Since the displacement preventer 65 thus presses the stabilizer bar 11 against the first curved portion 35 of the first die 61 with the semi-finished product 31 interposed therebetween, the forging die apparatus 60 can firmly press the semi-finished product 31 to a predetermined set position, and hold the semi-finished product 31 there immovably.

In this way, when caulked and attached on the stabilizer bar 11 using the first and second dies 61, 63 shown in FIG. 7, the semi-finished product 31 of the movement restriction member 23 of the present invention is securely fixed to the stabilizer bar 11 without displacement, owing to the knurled pattern 38a of the anti-slippage portion 38, the anti-slippage material Co containing alumina powder or the like, and the displacement preventer 65.

This can prevent displaced caulking of the semi-finished product 31 around the stabilizer bar 11 to prevent production of defective products, and also can fix the semi-finished product 31 to the stabilizer bar 11 in a predetermined wrapping manner.

In the outside-dimension positioning, shown in FIGS. 11 and 12, performed using the outer surface 31b of the semi-finished product 31 as reference, the first die holder 62 holding the first die 61 is turned halfway so that the outer surface 31b of the semi-finished product 31 will be at a predetermined outside-dimension determination position, and is then fastened with the fasteners 83 so that the first die holder 62 may be fixed to the jig main body 81 of the jig 80 with the fixation blocks 82.

By thus turning the first die holder 62 and the first die 61 to the outside-dimension determination position and fixing the first die holder 62 there with the jig 80, the forging die apparatus 60 of the present invention can attach the semi-finished product 31 to the stabilizer bar 11 with the reference surface changed to the outer surface 31b of the semi-finished product 31. Due to its capability of easily changing the arrangement in the jig 80 by turning the first die holder 62 to the inside-dimension determination position or the outside-dimension determination position and fixing the first die holder 62 at that position with the jig 80, the forging die apparatus 60 attaches the semi-finished product 31 to the stabilizer bar 11 according to any of the two reference surfaces. The forging die apparatus 60 thus improves the production efficiency.

<First Modification>

The present invention is not limited to the embodiment described above, and can be variously improved or modified without departing from the technical concept thereof. It is needless to say that the present invention includes such improved or modified inventions, as well. Note that the configurations already described are denoted by the same reference signs and are not described in detail again below.

Figure 20A:
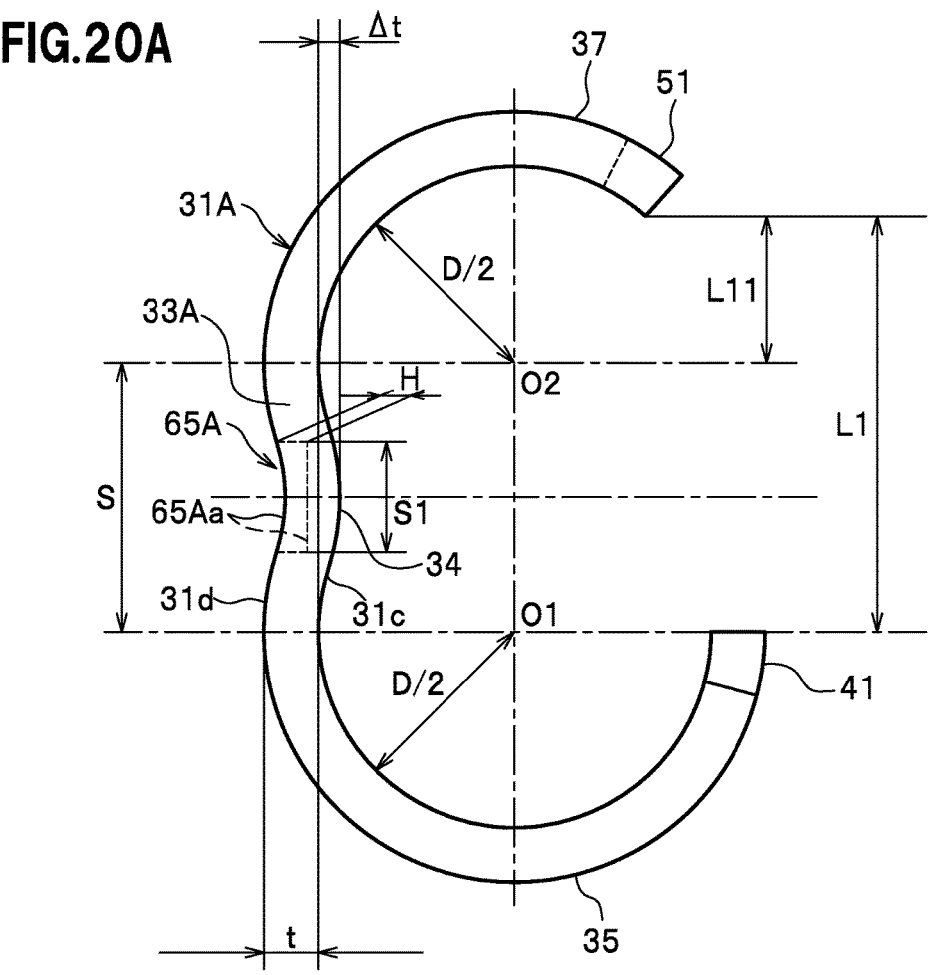
FIGS. 20A and 20B are diagrams showing the structure of a semi-finished product for a movement restriction member according to a first modification, FIG. 20A being an enlarged side view, FIG. 20B being a schematic enlarged perspective view showing a main part including an unevenness portion of the semi-finished product.
Figure 20B:
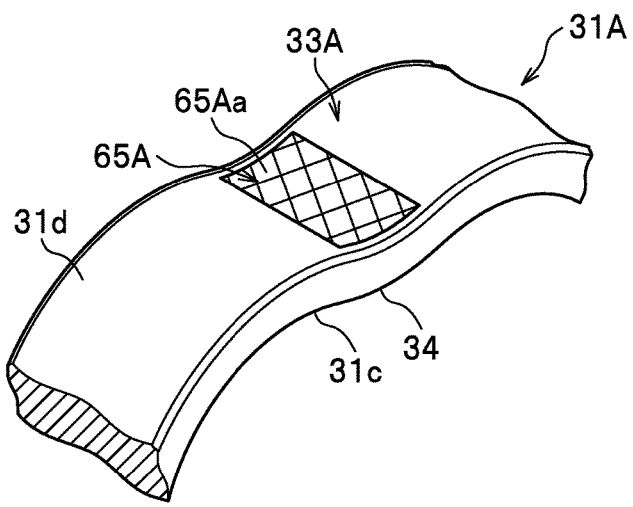

FIGS. 20A and 20B are diagrams illustrating a first modification of the structure of a semi-finished product for a movement restriction member, FIG. 20A being an enlarged side view of the semi-finished product, FIG. 20B being a schematic, enlarged perspective view showing a main part including an unevenness portion of the semi-finished product.

In the above embodiment, the semi-finished product 31 having a letter C shape, as shown in FIG. 3, in which the bridge portion 33 between the first curved portion 35 and the second curved portion 37 extends straight and flat is described as an example of the semi-finished product 31 of the movement restriction member 23 according to the present invention. The semi-finished product 31 is, however, not limited to such a configuration. For example, the semi-finished product 31 may be a semi-finished product 31A shown in FIGS. 20A and 20B, in which a bridge portion 33A has a bulge portion 34 extending along the center line O1-O2 while curving to bulge in an arc shape.

The bulge portion 34 thus formed in the bridge portion 33A of the semi-finished product 31A receives a force in a direction opposite to the bulging direction of the bulge portion 34 when the second curved portion 37 is pressed by the second die 63 (see FIG. 7) to be bent and caulked around the stabilizer bar 11. This force bends the bulge portion 34 toward the depressed side thereof (in the direction opposite to the bulging direction of the bulge portion 34), bending the bulge portion 34 into a smooth shape following the outer circumferential surface of the stabilizer bar 11 which is circular in cross section. Thus, when the semi-finished product 31A is caulked with the first die 61 and the second die 63, the bulge portion 34 enables the bridge portion 33A to be machined into a smooth surface without distortion and therefore improves the straightness (or flatness) of the bridge portion 33A.

The semi-finished product 31A according to the first modification of the present invention thus having the bulge portion 34 in the bridge portion 33A prevents distortion occurring when the second curved portion 37 is bent using the second die 63 (see FIG. 7) and enables the bridge portion 33A to be always bent into a shape following the outer circumferential surface of the stabilizer bar 11.

As shown in FIGS. 20A and 20B, the displacement preventer 65 (see FIGS. 7 and 8) described in the above embodiment may be a displacement preventer 65A formed of an unevenness portion 65Aa formed on an outer circumferential surface 31d of the bridge portion 33A of the semi-finished product 31A to prevent slippage of the semi-finished product 31A relative to the first and second dies 61, 63.

In this case, to provide slippage resistance, the unevenness portion 65Aa is formed by, like the knurled pattern 38a, many relatively small recesses and projections. The size, shape, and the like are not limited. The unevenness portion 65Aa may be any unevenness providing slippage resistance, such as an unevenness formed by engraving letters, marks, or the like, groove-shaped, linear, or reticular unevenness, or a projection portion of an increased thickness or a recessed portion of a decreased thickness. If formed by engraving, the unevenness portion 65Aa is about 0.5 mm high. Note that the unevenness portion 65Aa disappears upon caulking by being crushed.

The unevenness portion 65Aa has a height H of about 0.5 mm, and a length S1 of about 10 mm, which is measured in the longitudinal direction of the bridge portion 33A. Thus, the ratio between the height H and the length S1 of the unevenness portion 65Aa is expressed by $$0.5/10=0.05.$$

A height $\Delta t$ of the bulge portion 34 of the bridge portion 33A has to be only 5% or less of a length S of the bulge portion 34, like the ratio between the height H and the length S1 of the unevenness portion 65Aa. Thus, $$\Delta t/S \leq 0.05.$$

The unevenness portion 65Aa is provided to the semi-finished product 31A if the semi-finished product 31A is likely to slip relative to the first and second dies 61, 63 (see FIG. 7) when held with the first and second dies 61, 63 and fixed to the stabilizer bar 11 by caulking. If the semi-finished product 31A is unlikely to slip relative to the first and second dies 61, 63 (see FIG. 7), the unevenness portion 65Aa does not need to be formed.

<Second Modification>

Figure 21:
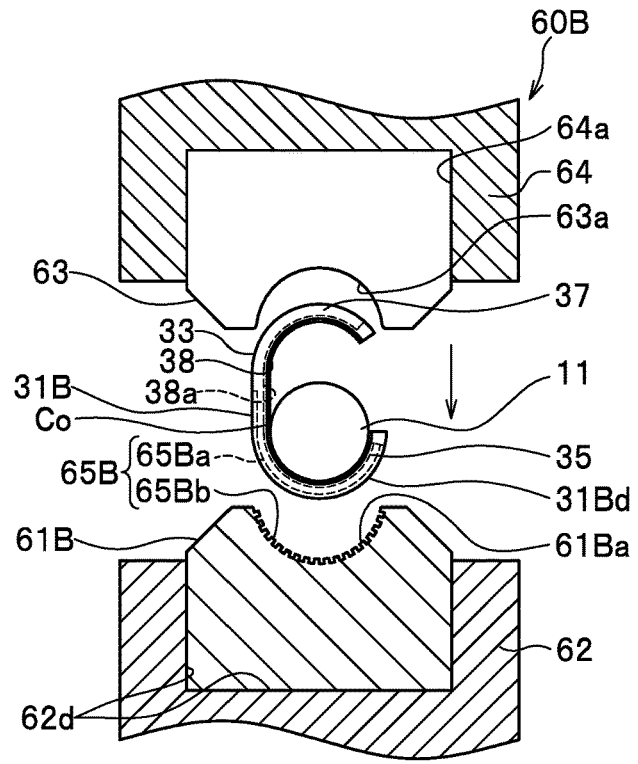
FIG. 21 is a partially-sectional, schematic side view of a main part of a forging die apparatus according to a second modification.

FIG. 21 is a partially-sectional, schematic side view of a main part of a forging die apparatus according to a second modification.

The unevenness portion 65Aa of the displacement preventer 65A described in the first modification is not limited to being formed on the outer circumferential surface 31d of the bridge portion 33A of the semi-finished product 31A as shown in FIGS. 20A and 20B. For example, like a displacement preventer 65B of a forging die apparatus 60B (apparatus for attaching a semi-finished product) shown in FIG. 21, the unevenness portion 65Aa may be at least one of an unevenness portion 65Ba formed on an outer circumferential surface 31Bd of a semi-finished product 31B and an unevenness portion 65Bb formed on a cavity 61Ba of a first die 61B facing the outer circumferential surface 31Bd of the semi-finished product 31B.

Frictional resistance between the semi-finished product 31B and the first die 61B may be increased by the unevenness portion 65Ba formed on the outer circumferential surface 31Bd of the semi-finished product 31B and/or the unevenness portion 65Bb formed on the cavity 61Ba of the first die 61B to prevent the semi-finished product 31B from slipping relative to the first die 61B.

<Third Modification>

Figure 22:
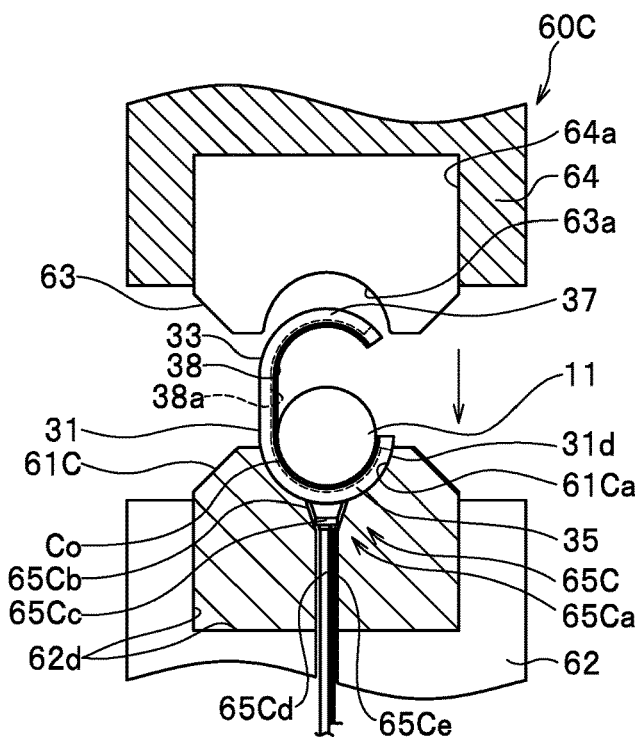
FIG. 22 is a partially-sectional, schematic side view of a main part of a forging die apparatus according to a third modification.
Figure 23:
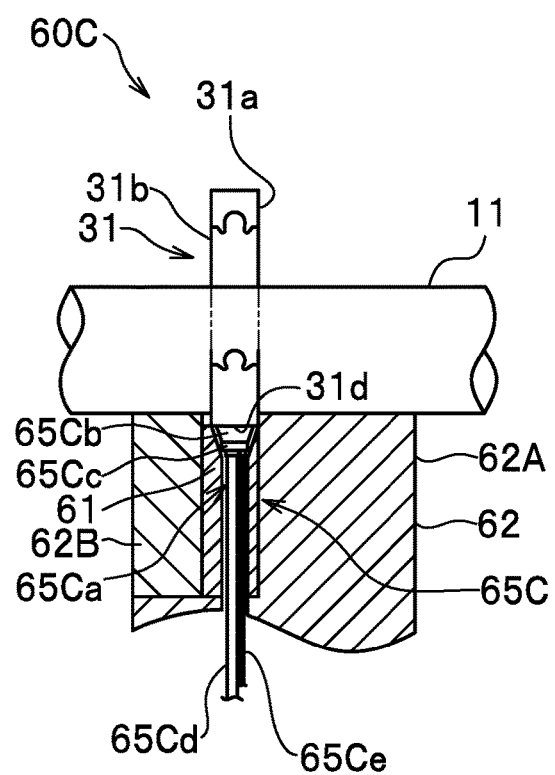
FIG. 23 is a partially-sectional, schematic front view of a main part of the forging die apparatus according to the third modification.

FIG. 22 is a partially-sectional, schematic side view of a main part of a forging die apparatus according to a third modification. FIG. 23 is a partially-sectional, schematic front view of a main part of the forging die apparatus according to the third modification.

In the embodiment described above, the gas spring 65a pressing the first die 61 downward with the stabilizer bar 11 and the semi-finished product 31 being interposed therebetween as shown in FIG. 10 is described as an example of the displacement preventer 65 of the forging die apparatus 60. Alternatively, like a displacement preventer 65C of a forging die apparatus 60C (apparatus for attaching a semi-finished product) shown in FIGS. 22 and 23, the displacement preventer 65 may be a suction device 65Ca configured to, instead of pressing, suck the semi-finished product 31 toward the first die 61C to press the semi-finished product 31 against the first die 61C for prevention of displacement of the semi-finished product 31. The suction device 65Ca of the displacement preventer 65C includes, for example, a sucker 65Cb configured to suck the semi-finished product 31 by air. The displacement preventer 65C configured as such can also securely hold the semi-finished product 31 using the sucker 65Cb.

The suction device 65Ca includes the sucker 65Cb whose outer circumference increases in diameter from a lower base end portion to an upper end portion, a suction pad main body 65Cc located at the base end portion of the sucker 65Cb, an actuator arm 65Cd provided at the suction pad main body 65Cc, a negative air pressure generator (not shown) configured to suck the air in the sucker 65Cb, a pipe 65Ce connected at one end to the suction pad main body 65Cc to communicate with the inside of the sucker 65Cb and at the other end to the negative air pressure generator (not shown).

A lower opening end of the sucker 65Cb having an increasing diameter like a skirt from an upper opening end thereof comes into contact with the outer circumferential surface 31d of the first curved portion 35 of the semi-finished product 31 when sucking the semi-finished product 31 toward the first die 61C by a suction force generated by the negative air pressure generator (not shown). The sucker 65Cb is made of a rubber, a synthetic resin, or a metal.

The actuator arm 65Cd is an arm part of a vertical mover (not shown) configured to vertically move the suction pad main body 65Cc provided to the tip of the actuator arm 65Cd. For example, the actuator arm 65Cd and the pipe 65Ce penetrate the first die 61C and the first die holder 62 and connect to the negative air pressure generator and the vertical mover (both not shown) placed outside of them.

The negative air pressure generator (not shown) is, for example, a vacuum pump, an air compressor, or the like.

The displacement preventer 65C configured as such can also prevent displacement of the semi-finished product 31 in caulking by the suction device 65Ca sucking the semi-finished product 31 set on the first die 61C and thereby pressing the outer circumferential surface 31d of the first curved portion 35 of the semi-finished product 31 against a cavity 61Ca of the first die 61C.

<Fourth Modification>

Figure 24:
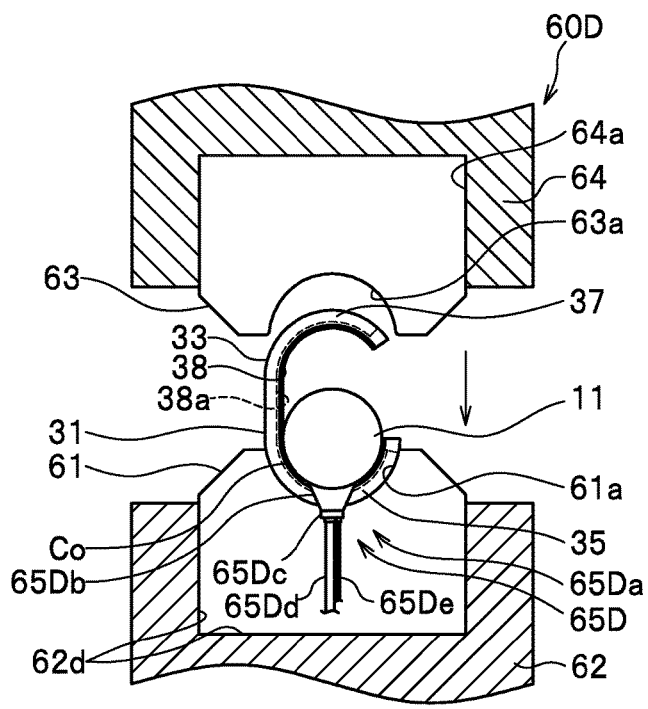
FIG. 24 is a partially-sectional, schematic side view of a main part of a forging die apparatus according to a fourth modification.
Figure 25:
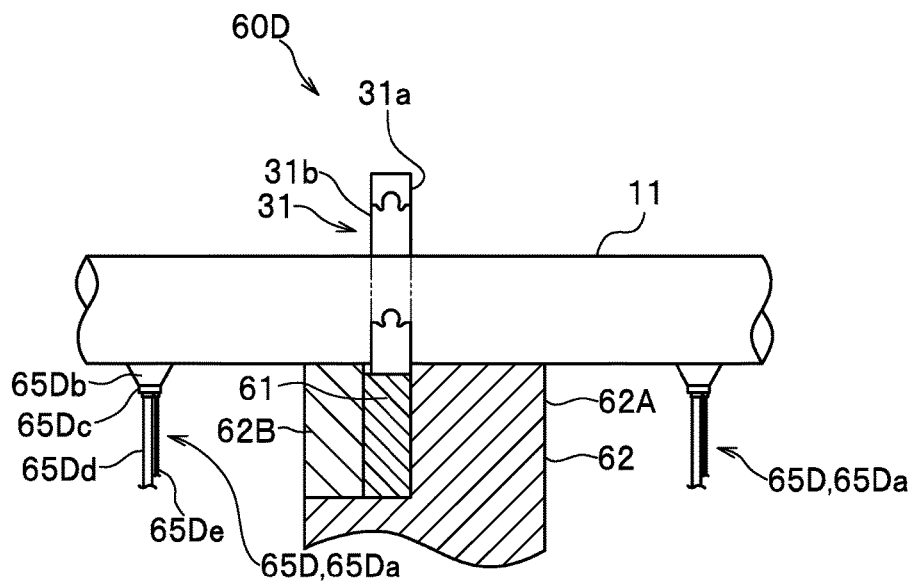
FIG. 25 is a partially-sectional, schematic front view of a main part of the forging die apparatus according to the fourth modification.

FIG. 24 is a partially-sectional, schematic side view of a main part of a forging die apparatus according to a fourth modification. FIG. 25 is a partially-sectional, schematic front view of a main part of the forging die apparatus according to the fourth modification.

The displacement preventer 65C according to the third modification described above sucks and presses the semi-finished product 31 toward the first die 61C with the suction device 65Ca. Instead, the stabilizer bar 11 may be sucked toward the first die 61 with the semi-finished product 31 interposed therebetween to prevent displacement of the semi-finished product 31, like a suction device 65Da of a displacement preventer 65D according to a fourth embodiment shown in FIGS. 24 and 25.

The displacement preventer 65D of a forging die apparatus 60D (apparatus for attaching a semi-finished product) includes a sucker 65Db configured to suck the stabilizer bar 11 using negative air pressure generated by the suction device 65Da. The displacement preventer 65D is capable of securely holding the semi-finished product 31 in place.

The suction device 65Da of the fourth modification includes, like the suction device 65Ca of the third modification, the sucker 65Db brought to contact with the stabilizer bar 11, a suction pad main body 65Dc, an actuator arm 65Dd configured to elevate and lower the suction pad main body 65Dc, a negative air pressure generator (not shown) configured to generate negative air pressure, and a pipe 65De configured to supply the negative air pressure to the inside of the sucker 65Db.

<Other Modifications>

In the above embodiment, as shown in FIG. 2 or 7, the anti-slippage portion 38 is formed on the inner circumferential surface 31c of the semi-finished product 31 which is caulked by the first die 61 and the second die 63 such that the inner circumferential surfaces 31c of the bridge portion 33, the first curved portion 35, and the second curved portion 37 are pressure-contacted to the outer circumferential surface of the stabilizer bar 11 with the stabilizer bar 11 being placed on the inner circumferential surface 31c of the first curved portion 35. The present invention is not limited to this. The anti-slippage portion 38 may be formed on at least one of the inner circumferential surface 31c of the semi-finished product 31 and the outer circumferential surface 31d of the stabilizer bar 11 facing the inner circumferential surface 31c. In other words, the anti-slippage portion 38 may be formed on the outer circumferential surface of the stabilizer bar 11 facing the inner circumferential surface 31c of the semi-finished product 31 instead or as well.

The anti-slippage material Co is not limited to being applied to the inner circumferential surface 31c of the semi-finished product 31 as long as it is located at such a position to enable prevention of slippage between the outer circumferential surface of the stabilizer bar 11 and the inner circumferential surface 31c of the semi-finished product 31. For example, the anti-slippage material Co may be applied to the outer circumferential surface of the stabilizer bar 11 at a portion to which the semi-finished product 31 is to be attached.

Although the knurled pattern 38a is described as an example of the anti-slippage portion 38 in the embodiment described above, the present invention is not limited this. For example, the anti-slippage portion 38 may be formed by shot peening as recesses depressed by 30 μm to 700 μm or projections protruding by 30 μm to 700 μm.

The anti-slippage portion 38 configured as such can still prevent slippage between the stabilizer bar 11 and the semi-finished product 31.

Although the first lock portion 41 is formed at the first curved portion 35 and the second lock portion 51 is formed at the second curved portion 37 in the above embodiment, the present invention is not limited to this. Conversely, the second lock portion 51 may be formed at the first curved portion 35, and the first lock portion 41 may be formed at the second curved portion 37.

Although the first die 61 is the stationary lower die and the second die 63 is the movable upper die in the embodiment described above, the present invention is not limited to this. Conversely, the first die 61 may be a movable upper die, and the second die 63 may be a stationary lower die, for example. Alternatively, both the first and second dies 61, 63 may be configured to move toward each other and apply forces in their moving respective directions.

Although the semi-finished product 31, 31A, 31B of the movement restriction member 23 is attached to the stabilizer bar 11 in the embodiment and the first to fourth modifications, the present invention is not limited to this. A member to which the semi-finished product 31, 31A, 31B is attached may be any bar whose section is circular. Similarly, the apparatuses 60, 60B, 60C, 60D (apparatus for attaching a semi-finished product) may be an apparatus for attaching the semi-finished product 31, 31A, 31B to any bar member.

REFERENCE SIGNS LIST 11 stabilizer bar (bar member)
23 movement restriction member
31, 31A, 31B semi-finished product
31a inner surface
31b outer surface
31c inner circumferential surface
31d, 31Bd outer circumferential surface
32 work in process
33, 33A bridge portion
35 first curved portion (engagement convex portion)
37 second curved portion (engagement convex portion)
38 anti-slippage portion
38a knurled pattern
41 first lock portion
51 second lock portion
60, 60B, 60C, 60D forging die apparatus (apparatus for attaching a semi-finished product)
61, 61B, 61C first die
61a, 61Ba, 61Ca cavity (first engagement concave portion)
62 first die holder
63 second die
63a cavity
65, 65A, 65B, 65C, 65D displacement preventer
65Aa, 65Ba unevenness portion
65Bb unevenness portion (unevenness)
65Ca, 65Da suction device
65Cb, 65Db sucker
80 jig
a constant used for the lower limit of the dimension of a straight part on an inner surface side of the bridge portion
b constant used for the upper limit of the dimension of the straight part on the inner surface side of the bridge portion
Co anti-slippage material
D diameter of the stabilizer bar
L1 dimension between the first lock portion and the second lock portion L2 length dimension of a work in process center of the first curved portion
O1-O2 center line center of the second curved portion
S dimension of the straight part on the inner surface side of the bridge portion
Sa lower limit of the dimension of the straight part on the inner surface side of the bridge portion
Sb upper limit of the dimension of the straight part on the inner surface side of the bridge portion
T plate thickness of a raw material of the movement restriction member

The invention claimed is:

1. A structure of a semi-finished product for a movement restriction member fixed on a stabilizer bar for a vehicle, the semi-finished product comprising:
   a plate-shaped bridge portion;
   a first curved portion integrally extending from one end portion of the bridge portion; and
   a second curved portion integrally extending from another end portion of the bridge portion,
   the semi-finished product being formed in a letter C shape as a whole,
   the first curved portion including an end portion including a first lock portion,
   the second curved portion including an end portion including a second lock portion to engage with the first lock portion,
   the bridge portion, and respective inner circumferential surfaces of the first curved portion and the second curved portion are fixed on an outer circumferential surface of the stabilizer bar with the stabilizer bar placed on an inner circumferential surface of the first curved portion,
   the semi-finished product including an anti-slippage portion for increasing frictional resistance on an inner circumferential surface thereof,
   the semi-finished product being crimped on the stabilizer bar with the anti-slippage portion being pressed and fixed under frictional resistance on an anti-slippage material provided on the outer circumferential surface of the stabilizer bar, and
   wherein the anti-slippage portion comprises a knurled pattern formed with a recess or a projection, and
   wherein the anti-slippage material comprises a coating.

2. The structure set forth in claim 1,
   wherein the recess is depressed by 30 μm to 700 μm or the projection protrudes by 30 μm to 700 μm.

3. The structure of set forth in claim 1,
   wherein the anti-slippage portion comprises a powder of alumina.

4. The structure set forth in claim 1,
   wherein with L2 [mm] denoting a length dimension of a work in process before being formed into the letter C shape and S [mm] denoting a dimension of a straight part on an inner surface side of the bridge portion, the S in the semi-finished product of the letter C shape before being fixed to the stabilizer bar is expressed by $L2 \times 0.18 - 2 \leq S \leq L2 \times 0.18 + 2$ when a plate thickness T of a raw material of the movement restriction member is 5 mm to less than 10 mm, and $L2 \times 0.18 - 1 \leq S \leq L2 \times 0.18 + 3$ when the plate thickness T is 3 mm to less than 5 mm.

5. A structure of a stabilizer bar and a semi-finished product for a movement restriction member fixed on each other,
   the semi-finished product comprising:
   a plate-shaped bridge portion;
   a first curved portion integrally extending from one end portion of the bridge portion; and
   a second curved portion integrally extending from another end portion of the bridge portion,
   the semi-finished product being formed in a letter C shape as a whole,
   the first curved portion including an end portion including a first lock portion,
   the second curved portion including an end portion including a second lock portion to engage with the first lock portion,
   the bridge portion, and respective inner circumferential surfaces of the first curved portion and the second curved portion are fixed on an outer circumferential surface of the stabilizer bar with the stabilizer bar placed on an inner circumferential surface of the first curved portion,
   the semi-finished product including an anti-slippage portion for increasing frictional resistance on an inner circumferential surface thereof,
   the semi-finished product is crimped on the stabilizer bar with the anti-slippage portion being pressed and fixed under frictional resistance on an anti-slippage material provided on the outer circumferential surface of the stabilizer bar, and
   wherein the anti-slippage portion comprises a knurled pattern formed with a recess or a projection, and
   wherein the anti-slippage material comprises a coating.

6. The structure set forth in claim 5, wherein the recess is depressed by 30 μm to 700 μm or the projection protrudes by 30 μm to 700 μm, and
   wherein the coating has a thickness of 30 μm to 40 μm.

* * * * *